US010213965B2

(12) United States Patent
Hoyt et al.

(10) Patent No.: US 10,213,965 B2
(45) Date of Patent: Feb. 26, 2019

(54) ARCHITECTURE, METHODS, AND APPARATUS FOR ADDITIVE MANUFACTURING AND ASSEMBLY OF SPARSE STRUCTURES, MULTIFUNCTIONAL STRUCTURES, AND COMPONENTS FOR SPACE AND TERRESTRIAL SYSTEMS

(71) Applicant: Tethers Unlimited, Inc., Bothwell, WA (US)

(72) Inventors: Robert Hoyt, Bothell, WA (US); Gregory Kirkos, Bothell, WA (US); Jeffrey Slostad, Bothell, WA (US); Gregory Jimmerson, Bothell, WA (US); Todd Moser, Bothell, WA (US); Mark Jaster, Bothell, WA (US); Nicholas Barsalou, Bothell, WA (US)

(73) Assignee: TETHERS UNLIMITED INC, Bothell, WA (US)

( * ) Notice: Subject to any disclaimer, the term of this patent is extended or adjusted under 35 U.S.C. 154(b) by 646 days.

(21) Appl. No.: 14/553,970

(22) Filed: Nov. 25, 2014

(65) Prior Publication Data

US 2016/0067919 A1    Mar. 10, 2016

Related U.S. Application Data

(60) Provisional application No. 61/908,711, filed on Nov. 25, 2013.

(51) Int. Cl.
*B29C 67/00*    (2017.01)
*E04C 3/28*    (2006.01)
(Continued)

(52) U.S. Cl.
CPC ........ *B29C 67/0055* (2013.01); *B29C 64/106* (2017.08); *B29C 70/205* (2013.01);
(Continued)

(58) Field of Classification Search
CPC ..... B29C 67/0055; B29C 70/205; E04C 3/28; B33Y 10/00; B33Y 30/00
See application file for complete search history.

(56) References Cited

U.S. PATENT DOCUMENTS

| 2004/0247866 A1* | 12/2004 | Jensen | B29C 53/564 428/364 |
| 2009/0021047 A1* | 1/2009 | Roush | B29C 53/043 296/181.3 |

FOREIGN PATENT DOCUMENTS

JP    11201364 A  *  7/1999

* cited by examiner

*Primary Examiner* — Jacob T Minskey
*Assistant Examiner* — Melody Tsui
(74) *Attorney, Agent, or Firm* — Arthur M. Dula; Scott L. Maddox

(57) ABSTRACT

A truss-formation apparatus comprising two truss makers and a lateral stage, wherein the truss makers create trusses and each truss maker comprises thermal dies, heaters with temperature sensors, and mandrels; wherein the truss makers form trusses that comprise parallel truss elements and battens; wherein a pultrusion actuator pulls parallel truss elements down along a mandrel; wherein a batten actuator causes a thermal die to rotate around a mandrel forming battens that connect parallel truss elements to one another; and wherein the lateral stage comprises a thermal die and traverses the gap between the parallel trusses forming cross members that connect the trusses.

3 Claims, 34 Drawing Sheets

(51) Int. Cl.
*B29C 70/20* (2006.01)
*B29C 64/106* (2017.01)
B29K 105/06 (2006.01)
B29K 101/12 (2006.01)
B29K 307/04 (2006.01)
B33Y 10/00 (2015.01)
B33Y 30/00 (2015.01)
B29L 31/60 (2006.01)

(52) U.S. Cl.
CPC ............ *E04C 3/28* (2013.01); *B29K 2101/12* (2013.01); *B29K 2105/06* (2013.01); *B29K 2307/04* (2013.01); *B29L 2031/602* (2013.01); *B33Y 10/00* (2014.12); *B33Y 30/00* (2014.12)

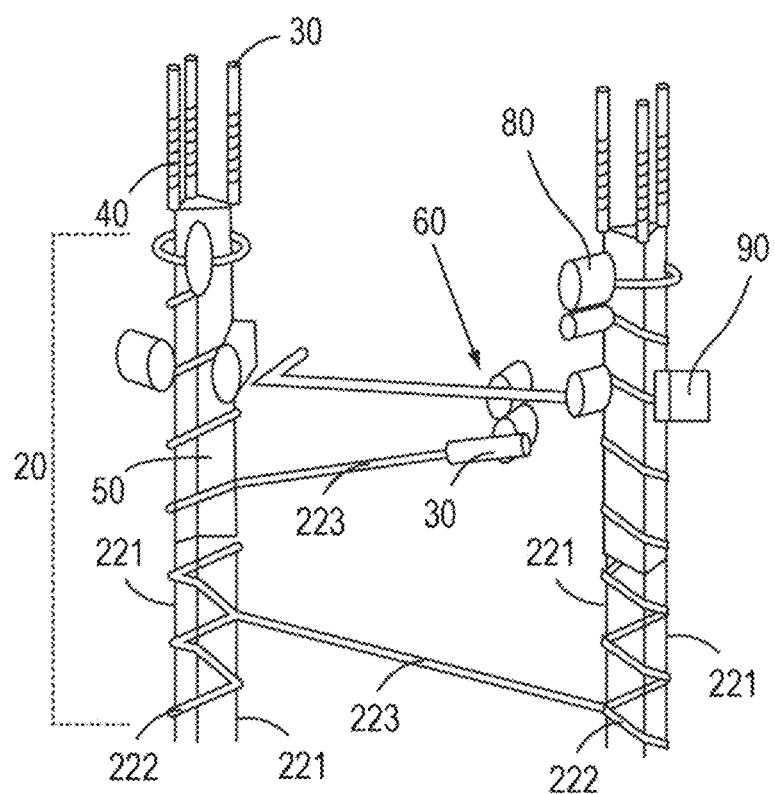

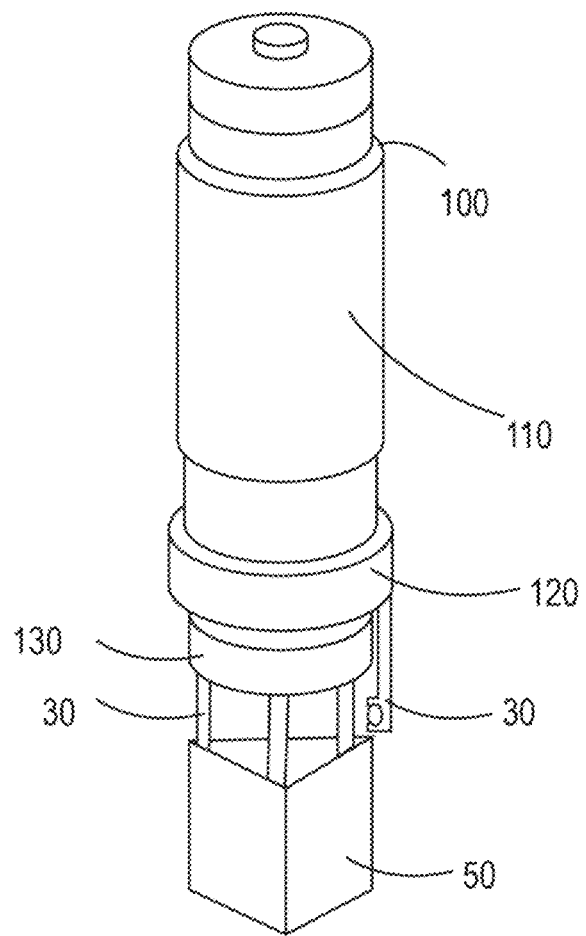

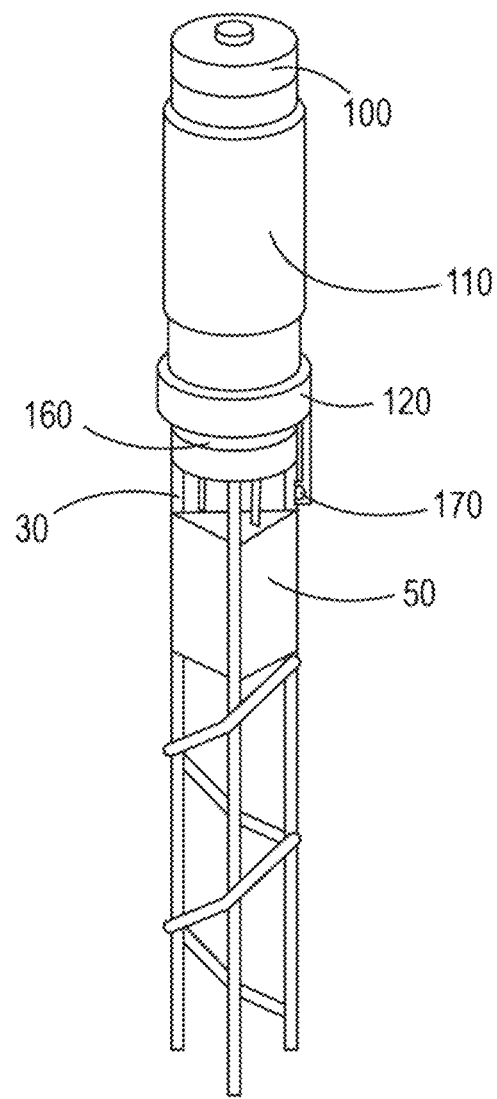

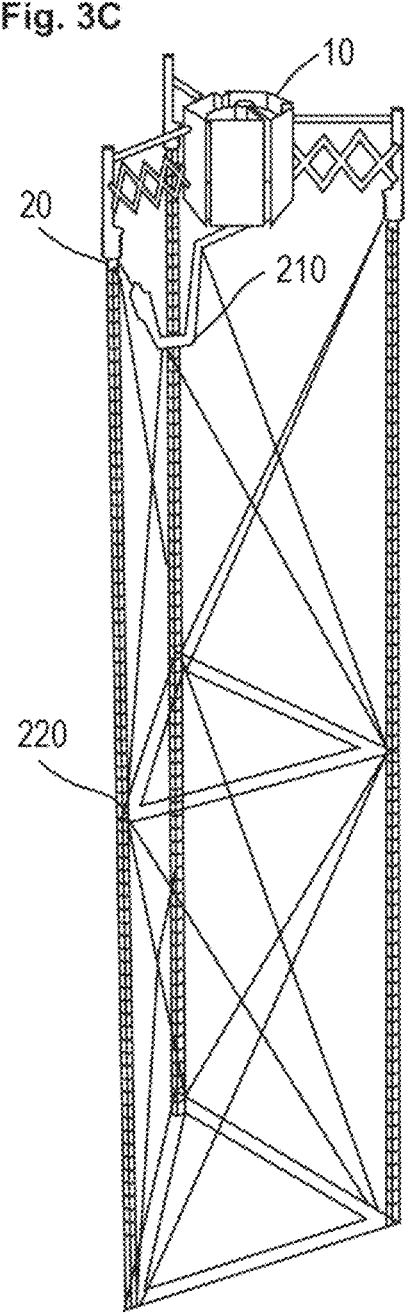

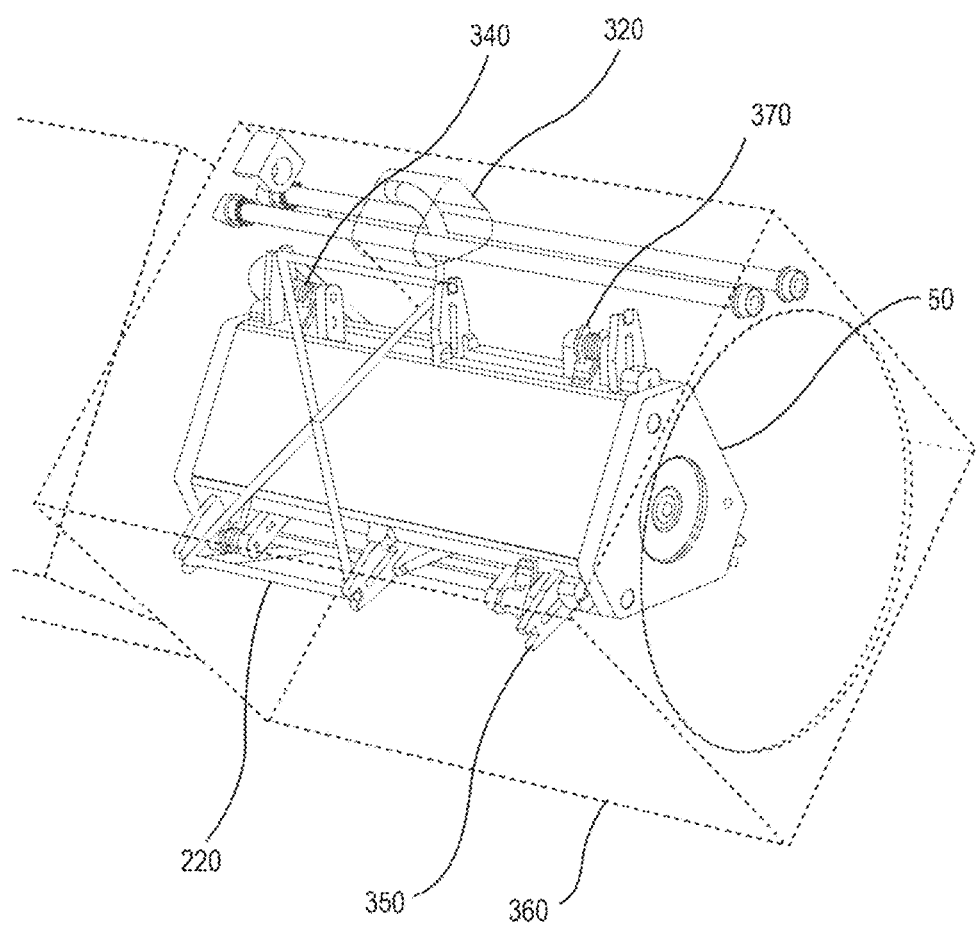
Fig. 7 - Feed head wraps truss segment.

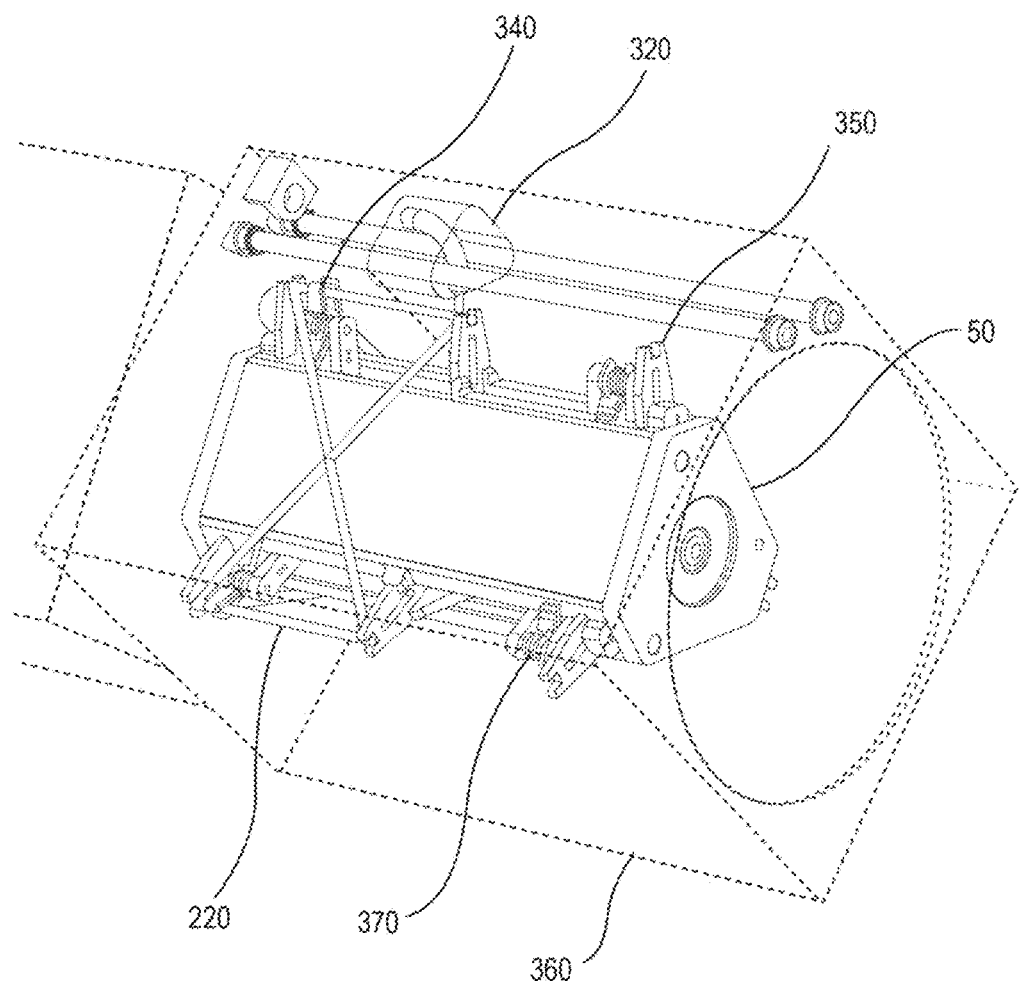
Fig. 8 - First set of grippers gab truss.

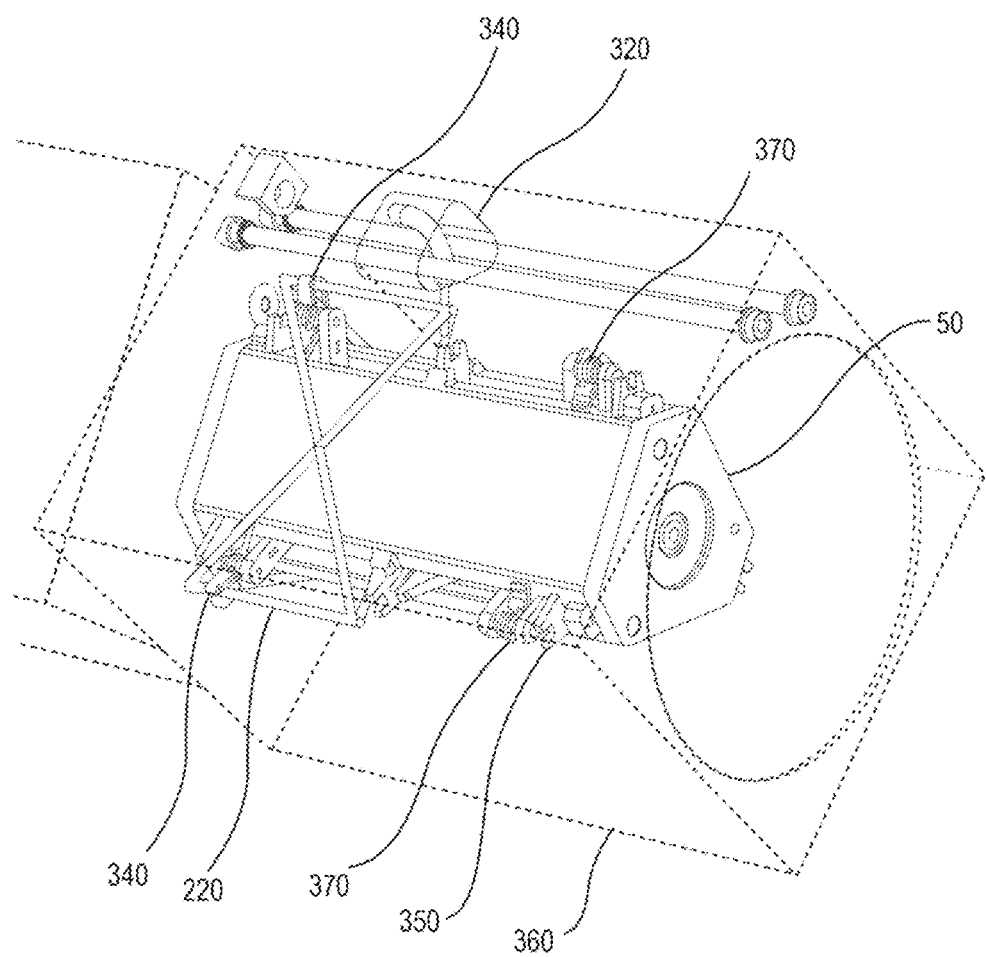
Fig. 9 - Jig pins react.

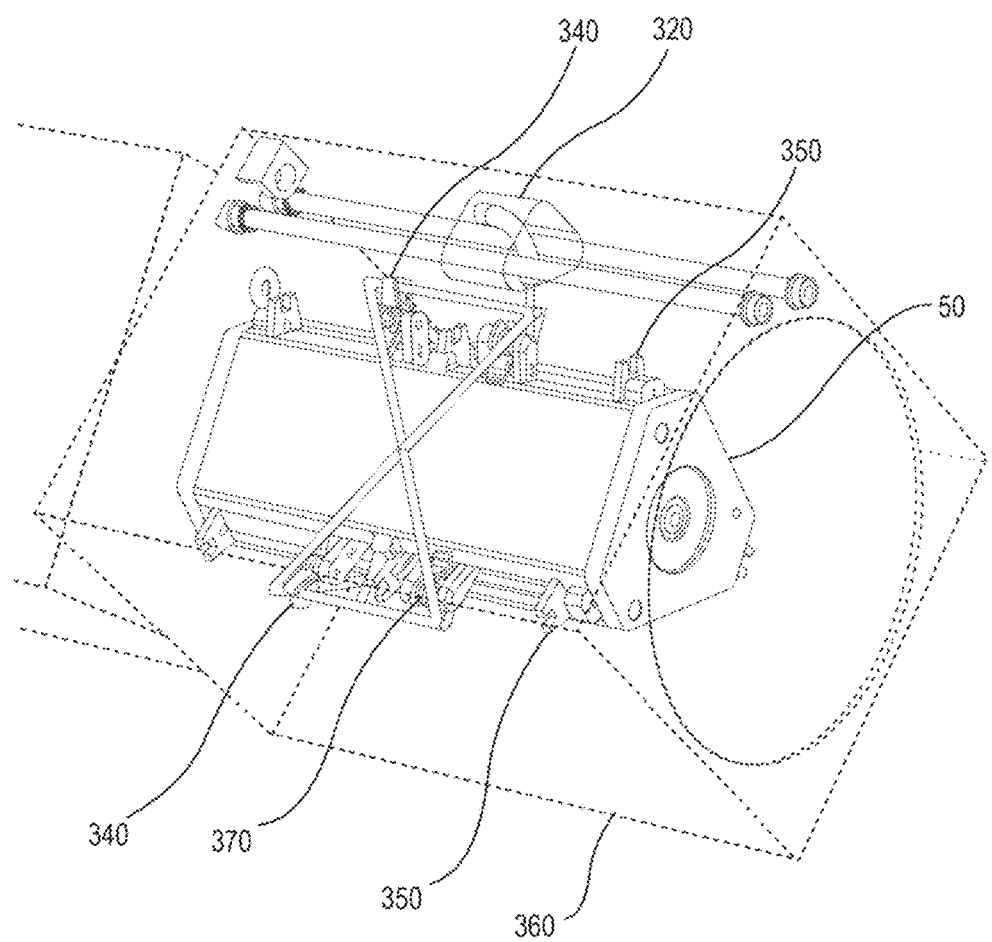
Fig. 10 - Grippers translate truss by 1/2 bay.

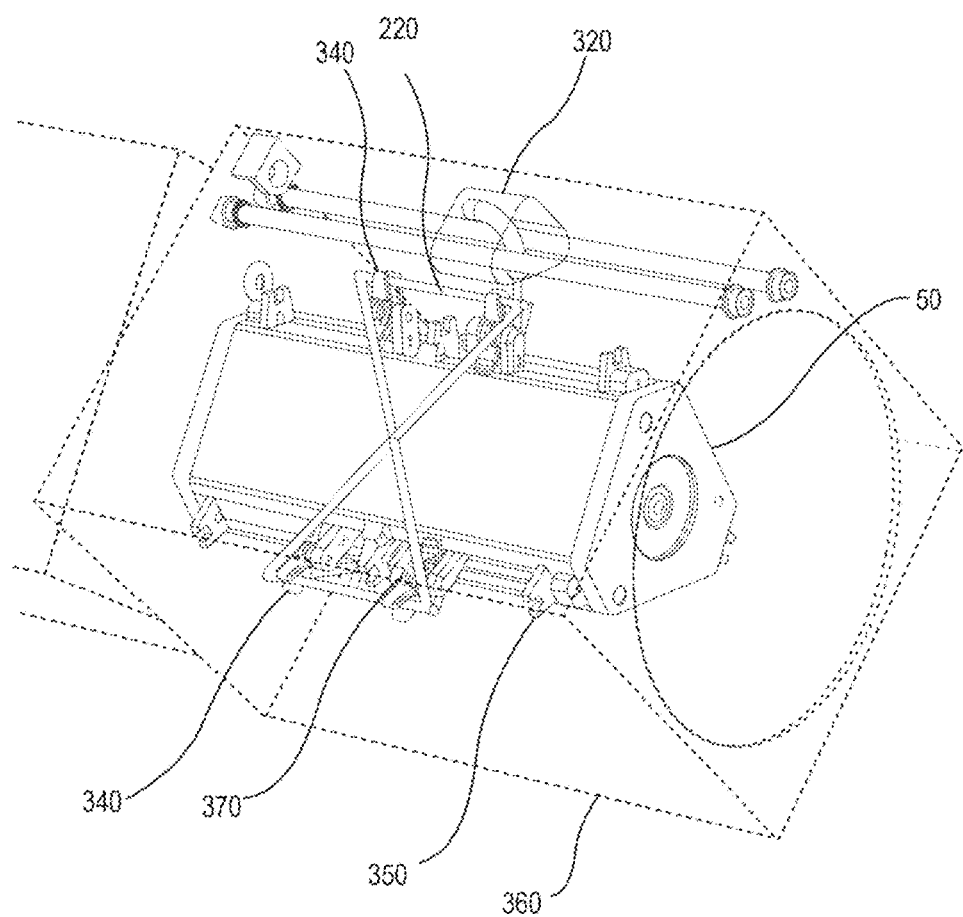
Fig. 11 - Second set of grippers grasp truss.

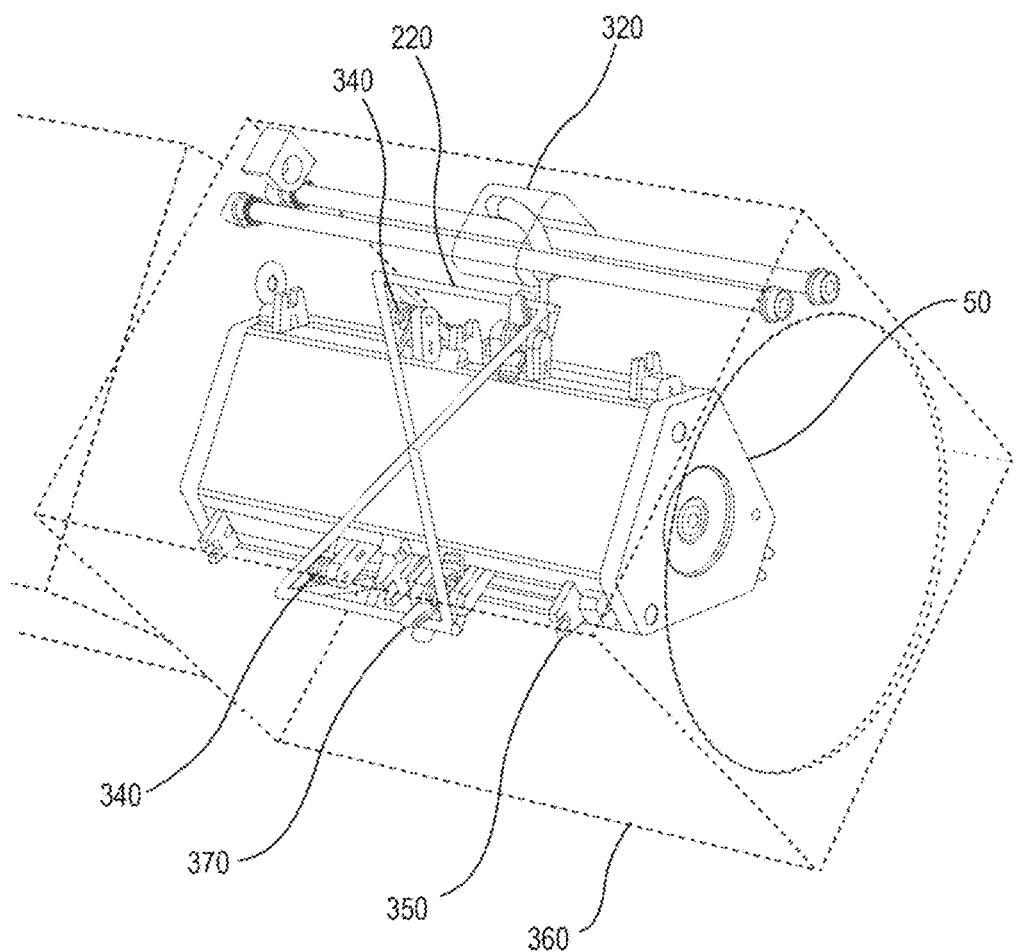
Fig. 12 - First set of grippers release truss.

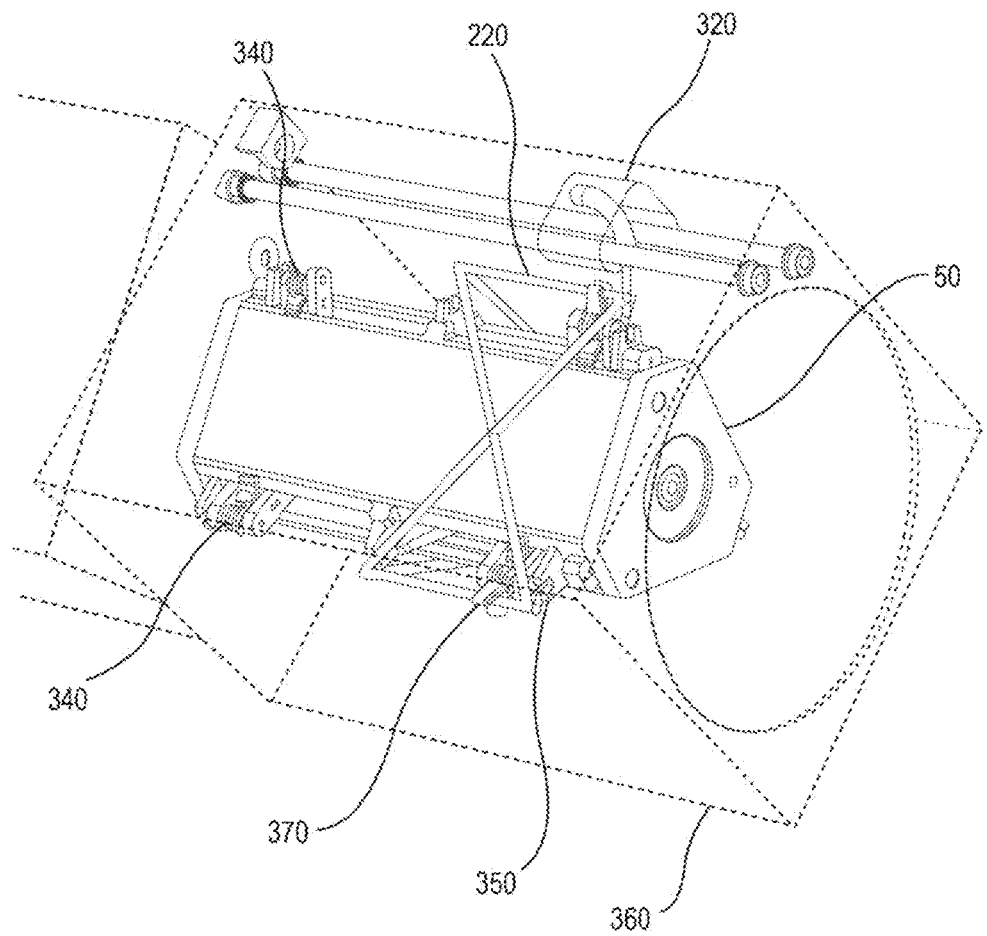
Fig. 13 - Grippers transulate truss to second bay.

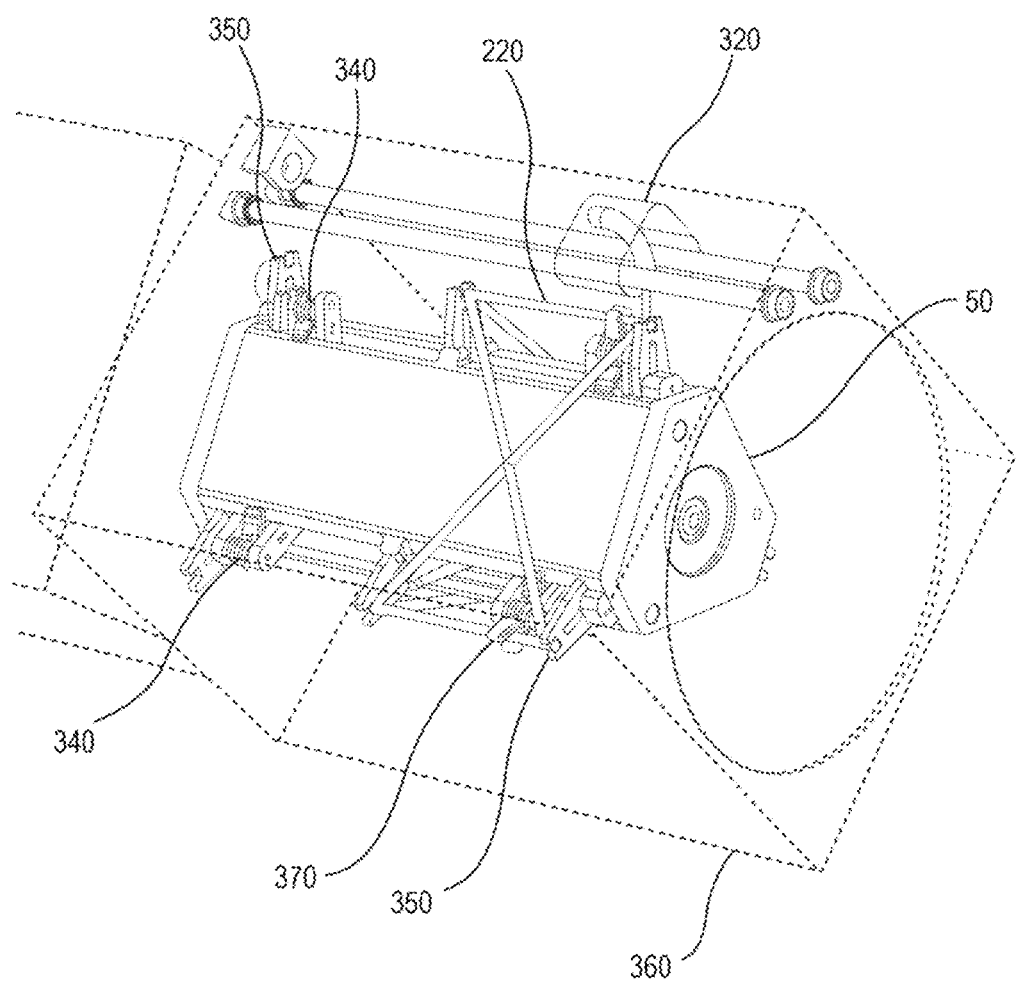
Fig. 14 - Jig pins extend.

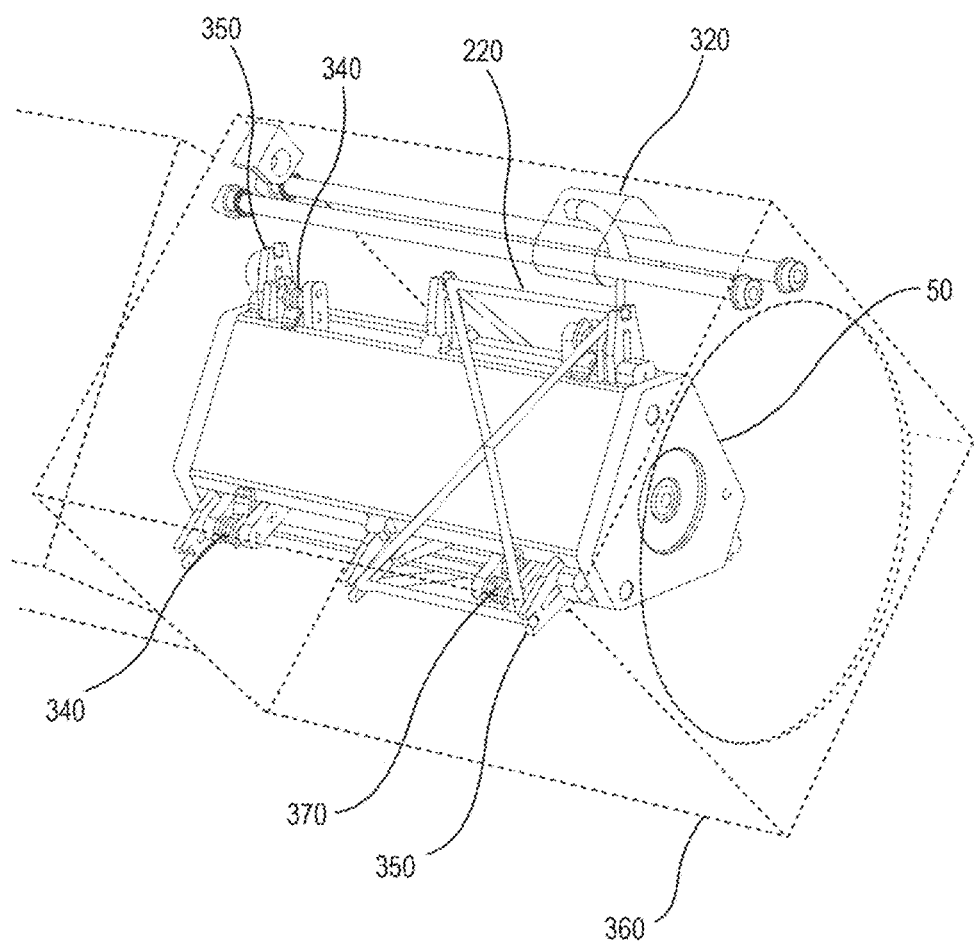
Fig. 15 - Grippers release.

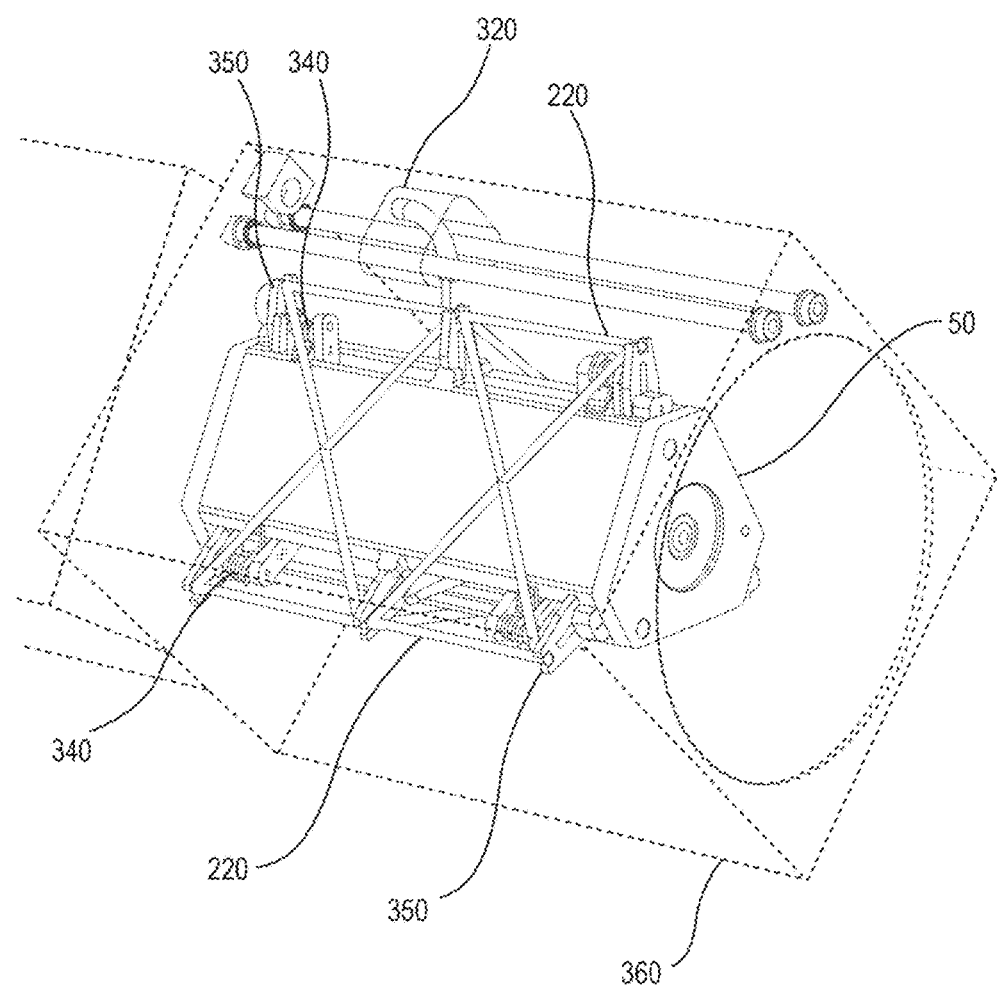
Fig. 16 - Feed head wraps second truss segment.

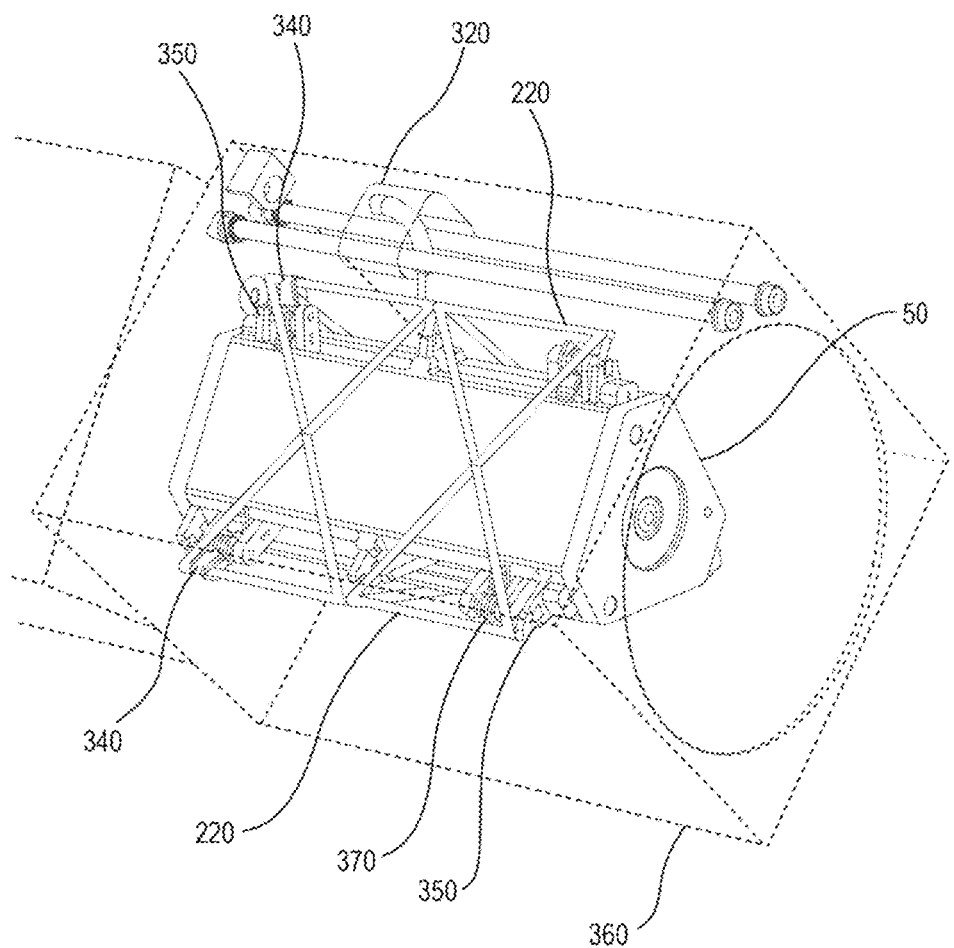
Fig. 17 - Grippers grab truss and jig pins react.

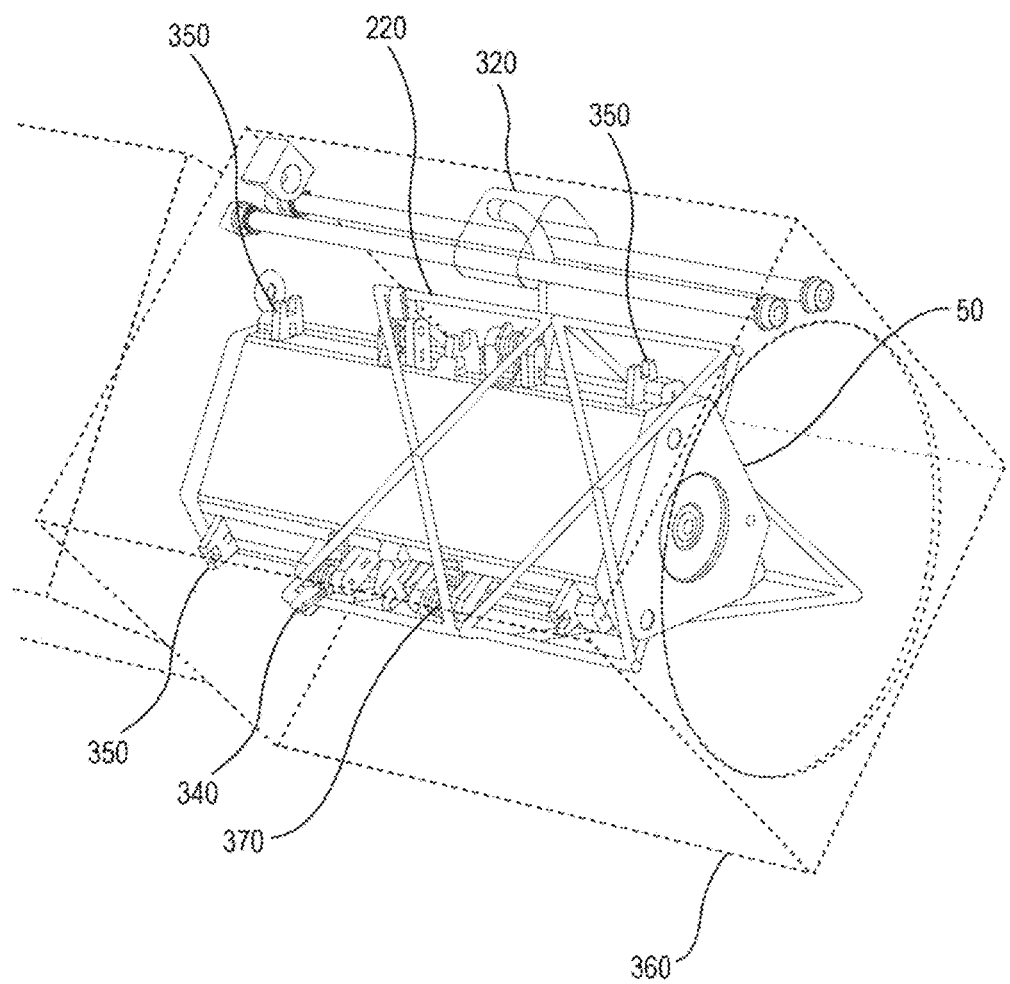
Fig. 18 - Grippers slide truss forward 1/2 bay.

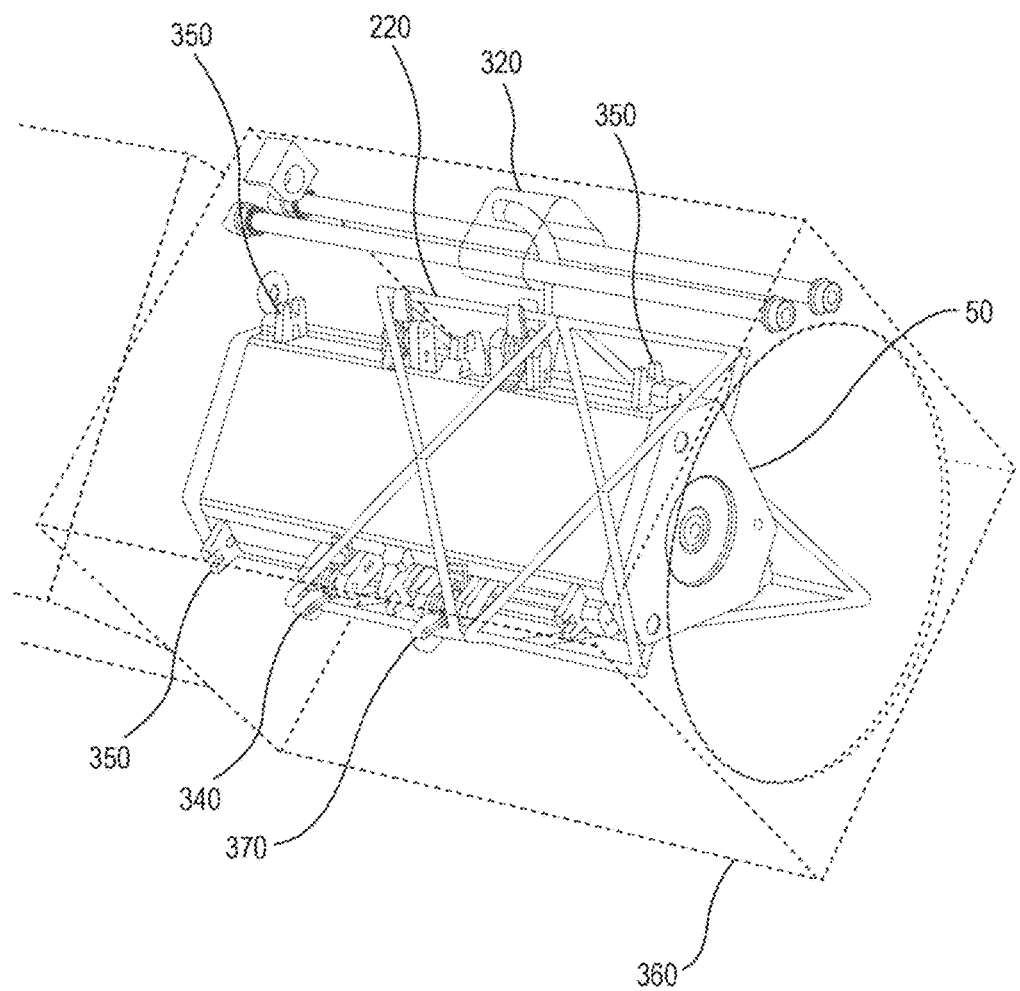
Fig. 19 - Second set of grippers grab truss.

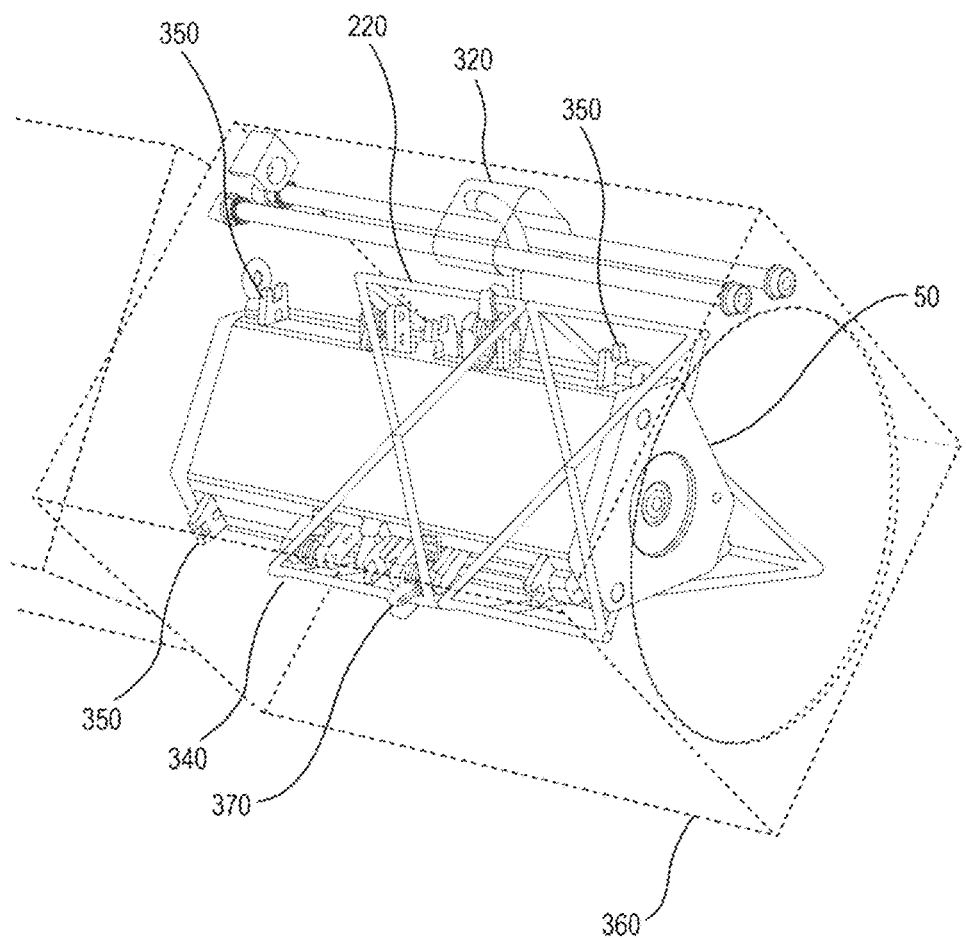
Fig. 20 - First set of grippers release truss.

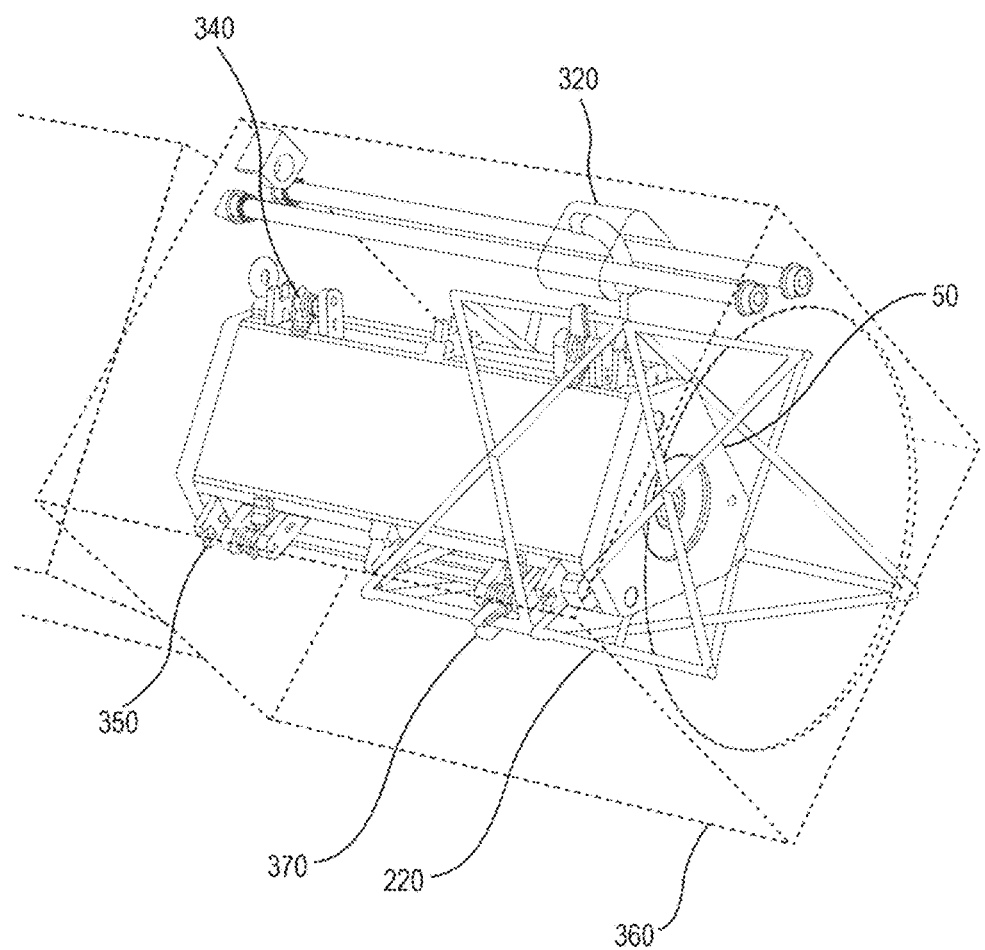
Fig. 21 - Grippers slide truss forward and so on...

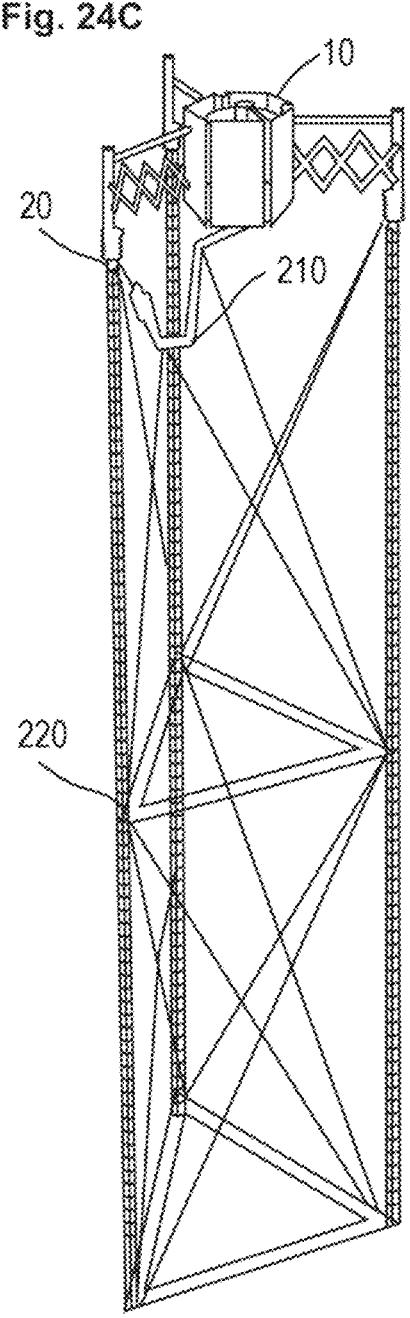

ARCHITECTURE, METHODS, AND APPARATUS FOR ADDITIVE MANUFACTURING AND ASSEMBLY OF SPARSE STRUCTURES, MULTIFUNCTIONAL STRUCTURES, AND COMPONENTS FOR SPACE AND TERRESTRIAL SYSTEMS

This application claims the benefit of provisional application No. 60/908,711 filed on 25 Nov. 2013.

This invention was made with government support under contract HR0011-11-C-0107 awarded by DARPA. The government has certain rights in the invention.

DESCRIPTION

An embodiment could comprise: an architecture for on-orbit fabrication and assembly of space systems; additive manufacturing processes and methods designed to enable fabrication of sparse structures, complex multifunctional structures, and other components in the micro-gravity and vacuum environment in space; processes for "free-form fabrication" of 3-D structures using extrusion and/or pultrusion of materials; methods for joint bonding in free space; shape changing extrusion dies and die/cutter combinations to extrude structurally graded sparse structures; methods and apparatus for additive manufacturing of 3D structures using extrusion and/or pultrusion of variable combinations of high-tensile strength fibers, thermoplastics, epoxies, foams, and conductors; processes for additive manufacturing of composite structures; method and apparatus for fabrication of first and second order hierarchical composite truss structures; processes for driving, expanding, and setting thin walled tube elements from a sleeve stock; a method of fabricating large curved surfaces such as antenna reflectors; or processes for metrology of fabricated structures to enable closed-loop control of fabrication of complex structures.

An exemplary embodiment could enable structures to be carried into orbit as raw material, improving packing efficiencies by one to two orders of magnitude. Then, structures can be fabricated on-orbit, enabling a space structure to be simplified since the resultant structures are not required to survive launch stresses or fit in a spacecraft. For example, joints allowing a structure to fold up to fit in a spacecraft's payload bay are no longer required. Also, a structure optimized for an orbital environment, rather than a violent launch environment, can be one to two orders of magnitude less massive.

Examples of embodiments could comprise equipment and methods for fabricating large, complex multifunctional structures in the space environment, enabling practical deployment of space systems with very large apertures for RF or optical collection and/or transmission, long baselines between sensors for applications such as sparse aperture radar and astronomical interferometric observations, or other large, complex components, such as solar arrays, radiators, and structural elements. Described devices and methods could enable the constituent materials for a space system to be launched in a very compact, robust form and processed on-orbit to form components that are optimized for the space environment, rather than for the launch environment and reduce or eliminate costs associated with design and qualification for the launch environment, and can enable significant improvements in the deployed dimensional size of systems that can be launched within a given vehicle. Examples of these devices and methods can enable reductions in space system life-cycle cost while providing significant improvements in bandwidth, sensitivity, resolution, and other key performance metrics for space systems.

BRIEF DESCRIPTION OF THE DRAWINGS

The following figures illustrate examples of the described devices and methods.

FIG. 2A shows an embodiment comprising a truss maker and a lateral stage.

FIG. 2B shows an embodiment comprising a rotating stage and a static stage.

FIG. 2C shows an embodiment comprising a rotating stage and a moving heated die.

FIG. 3C shows an embodiment comprising a fractal-truss fabrication robot.

FIG. 7 shows an embodiment comprising a step in a method for making a truss.

FIG. 8 shows an embodiment comprising a step in a method for making a truss.

FIG. 9 shows an embodiment comprising a step in a method for making a truss.

FIG. 10 shows an embodiment comprising a step in a method for making a truss.

FIG. 11 shows an embodiment comprising a step in a method for making a truss.

FIG. 12 shows an embodiment comprising a step in a method for making a truss.

FIG. 13 shows an embodiment comprising a step in a method for making a truss.

FIG. 14 shows an embodiment comprising a step in a method for making a truss.

FIG. 15 shows an embodiment comprising a step in a method for making a truss.

FIG. 16 shows an embodiment comprising a step in a method for making a truss.

FIG. 17 shows an embodiment comprising a step in a method for making a truss.

FIG. 18 shows an embodiment comprising a step in a method for making a truss.

FIG. 19 shows an embodiment comprising a step in a method for making a truss.

FIG. 20 shows an embodiment comprising a step in a method for making a truss.

FIG. 21 shows an embodiment comprising a step in a method for making a truss.

FIG. 24C shows an embodiment comprising a trusselator (truss fabricator), a truss maker, a robot arm, and a truss.

DETAILED DESCRIPTION

Figure 1:
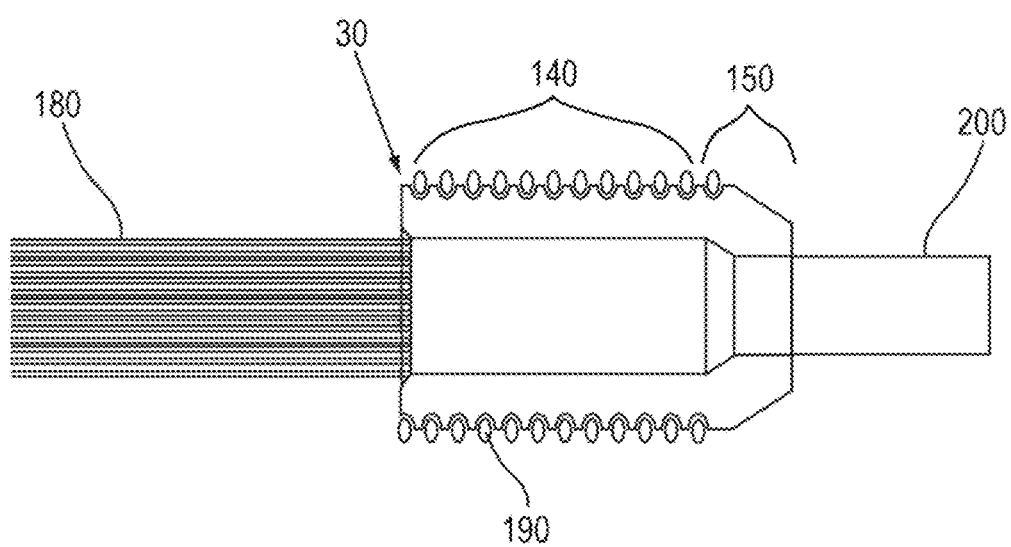
FIG. 1 shows an embodiment comprising a thermal die.

An example embodiment comprises a material feed-head for adding one or more materials to a structure in a controllable manner. The feed-head could use techniques such as extrusion, pultrusion, electron-beam melting, laser sintering, electro spinning, electrostatic repulsion or attraction, evaporation coating, or sputtering. The feed head may enable control of the feed rate of the material and may additionally comprise heaters to melt thermoplastics or otherwise control the temperature of the material being fabricated, mixers to combine resin and hardener, cutting implements to cut fibers, or gripping implements to attach fiber materials to an object. The material feed head could be controllably positioned and oriented in 3-D space relative to the structure being fabricated, using exemplary devices such as a 3-axis translation stage, one or more robotic arms, a free-flying spacecraft, or a cable and pulley system. Such an example would likely comprise a control system (such as a computer or Programmable Logic Controller) to control movement of the feed head and actuation of the material feed and control software capable of converting an electronic specification of the desired product (shape, material composition) into commands for the fabrication systems.

Embodiments can comprise feedstock material stored in a compact form that allows it to be delivered to the feed head in a controllable manner. For example, a spool wound with fiber yarns, pre-preg composites, monofilaments, staggered multi-material filaments or yarns comprising both thermoplastic filaments and high tensile strength yarns. Another option comprises liquid feedstock (such as epoxy resin and hardener) stored in one or more tanks. A third option comprises pellets of material (such as thermoplastic beads) stored in a bag or tank.

Embodiments can comprise a method of fabricating 3D structures with combinations of high tensile strength fibers or yarns and a matrix such as a thermoplastic or epoxy, with the orientation of the fiber and relative densities of fiber and matrix varied to optimize the structure for design loads. Optionally, coatings (such as thermal paints, conductive films, or photovoltaic materials) or thin membranes (such as layers of metalized Kapton for insulation or solar sails, or thin-film photovoltaics) can be added to a structure's surface, and conductors (such as wires or RF-reflective surfaces) can be incorporated into or onto structures during fabrication.

In an example method, feedstock and a fabrication system are delivered to a work site, which could be a factory, job site, orbital location, location on a planetary body, spacecraft, or an air, surface, or naval vessel. Then, the fabrication system positions and orients itself with respect to the environment and positions and orients one or more feed-heads with respect to itself. The feed-head extrudes or pultrudes material in a controllable manner. As it does so, it controllably varies its 3D position and 3D orientation with respect to the fabricated object. It also varies the position and orientation of its feed-head(s) with respect to either itself or the object so as to add material to the object with the desired shape, orientation, and material composition. Optionally, the fabrication system measures the shape or other physical characteristics of the object as it is fabricated and uses these measurements to adjust its motion or material feed so as to perform closed-loop control of the fabrication process. Also, an embodiment could optionally use a robotic arm or other mechanism to add sensors, avionics, actuators, antennas, photovoltaics, radiators, wires, optical fibers, or other components to the fabricated structure or use a robotic arm or other mechanism to connect two or more fabricated structures together to form a larger structure. An embodiment could optionally use localized heating from infrared or microwave sources combined with physical manipulation with robotic arms or other mechanisms to fix or otherwise adjust manufacturing imperfections or other damage to the structure.

Various embodiments could enable: automated or semi-automated construction of structures in a micro gravity environment; a machine to fabricate a structure that is much larger than the machine itself; construction of structures that incorporate multiple materials, such as high-strength yarns, thermoplastics, and conductive wires; and fabrication of 3D structures with orientation and density of high tensile strength fibers varied to optimize the structure for the design loads.

Additive manufacturing techniques, developed for the 1-g terrestrial environment, typically build up a 3D structure by laying down a sequence of flat 2D layers. The exemplary method described below enables adding elements to a structure in any desired 3-dimensional orientation to build up the structure like a spider spins a web, or a wasp builds its nest. First, a fabrication tool positions and orients itself on or with respect to the structure being built, then positions and orients the material feed head with respect to the structure, and then adds material to the structure either in a 3D conformal manner or by extending new structures out from the surface of the structure at any angle with respect to the surface by fabricating sparse (or dense) composite structures in an additive process, and controllably varying the composition and orientation of added fibers, matrix, and other materials (such as conductors and protective coatings) to produce a structure optimized to support the loads, temperatures, vibrations, currents, and signals it must bear in service.

An embodiment could comprise a control computer, control software, and a device for controllably moving the fabrication unit in relation to the object being created by a distance larger than the characteristic dimensions of the fabrication unit with at least 1 degree of freedom. For space applications, fabrication occurs in micro-gravity, possibly far away from any external structure or surface, so the ability to 'crawl' along the object itself, or free-fly relative to the object is helpful. An embodiment could also comprise means for positioning and orienting a material feed head with respect to the fabrication unit with at least 2 degrees of freedom and means for controllably feeding and attaching material onto the object being created.

Exemplary methods could comprise steps of: controlling the feed rate relative to the distance or projected path between the feed head and object; fabricating truss elements or other components and then assembling them by holding them in proper position relative to each other and squirting a foaming substance that will envelop the joint and harden (flexible joints may also be created in this manor); fabricating a solid structure using two or more materials, and then using a controllable process, such as application of UV light or plasma etching, to remove one of the materials to create mechanisms with moving parts, such as gears, wheels, or sliding elements.

Examples of materials that could be used instead of thermoplastic comprise plastic or polymeric material.

In terrestrial applications, an embodiment could enable fabrication of sparse composite and multifunctional structures that are significantly larger and higher performance than can be made with current additive manufacturing techniques. For example, in construction of buildings instead of trucking in large prefabricated steel structures or laboriously welding rebar reinforcements for concrete-automated fabrication of large sparse composite structures could take the place of rebar in reinforced concrete. This could reduce labor and transportation costs for construction. Other examples comprise fabrication of soil erosion control systems and under water structural supports.

Embodiments may comprise: fabrication of structures or objects much larger than the work tool; fabrication of composite structures with fiber orientation optimized for design loads; fabrication of large complex structures in the space environment; tool mobility in relation to the structure of object, rather than in relation to the environment; due to operating in a vacuum environment, reduced thermal gradients through structure or object being fabricated decreases internal stresses that cause warpage; operation in vacuum increases the bonding strength between joints and materials; operation in vacuum reduces contaminants and heater power requirements; operation in vacuum to increase part resolution; in place of mechanical means to pultrude material, using vacuum forces to draw material out of a die and control heater power to regulate drawing rate; operation in cold environment to increase stiffness of the part during build for increased resolution. Once the part has acclimated to its intended operating environment, the part's properties return to their viscoelastic state.

FIG. 1 shows an embodiment comprising a thermal die 30. The thermal die 30 comprises a melt section and a consolidation section 150. The melt section is wrapped with heater wire 190 to heat up and melt the Continuous Fiber Reinforced Thermoplastic (hereafter CFRTP) yarn 180 before it enters the consolidation section 150 where it is squeezed and extruded as a CFRTP solid element 200. This is an example of how a flexible yarn can be converted to a rigid member. An eight kilometer spool of fiberglass CFRTP that weighs only 12 kilograms is sufficient to fabricate a 100 meter long, 2 meter diameter truss.

FIG. 2A shows an embodiment comprising two truss makers 20 and a lateral stage 60. The truss makers 20 create trusses and comprise thermal dies 30, heaters with temperature sensors 40, and mandrels 50. Truss makers 20 form trusses 220 that comprise parallel truss elements 221 and battens 222. FIG. 2A shows two truss makers positioned to form trusses 220 that are parallel to one another. The pultrusion actuator 90 pulls parallel truss elements 221 down along mandrel 50. The batten actuator 80 causes a thermal die to rotate around a mandrel 50 forming battens 222 that connect parallel truss elements 221 to one another. The lateral stage 60 comprises a thermal die 30 and traverses the gap between the parallel trusses 220 forming cross members 223 that connect the trusses 220. The cross member rotation actuator 70 can adjust the angle of the lateral stage's thermal die 30 relative to the trusses 220.

FIG. 2B shows an embodiment comprising a rotating stage 120 and a static stage 130. The drive 100 causes the rotating stage 130 to rotate relative to the static stage. Truss material from the material store 110 goes to both of these stages. The static stage 130 forms parallel truss elements that extend straight out along the cooling form 50. Simultaneously, the rotating stage 120 forms truss elements (battens) that wrap around the parallel truss elements that extend along the cooling form 50 as the rotating stage rotates. The battens, the truss elements formed by the rotating stage 120, will connect the parallel truss elements to one 8.

FIG. 2C shows an embodiment comprising a rotating stage 120 and a moving heated die 170. The moving heated die 170 is mounted on the rotating stage 120 driven by gear drive 100. Material spool 110 supplies material feeds 160 to the heated dies 30 and the moving heated die 170. As truss material leaves the heated dies 30 and moving heated dies 170 it passes along the forming mandrel 50 and forms a truss 220. The forming mandrel 50 acts maintain the shape of the truss 220 by holding the truss material in the shape of the truss while it cools and becomes rigid.

Figure 3A:
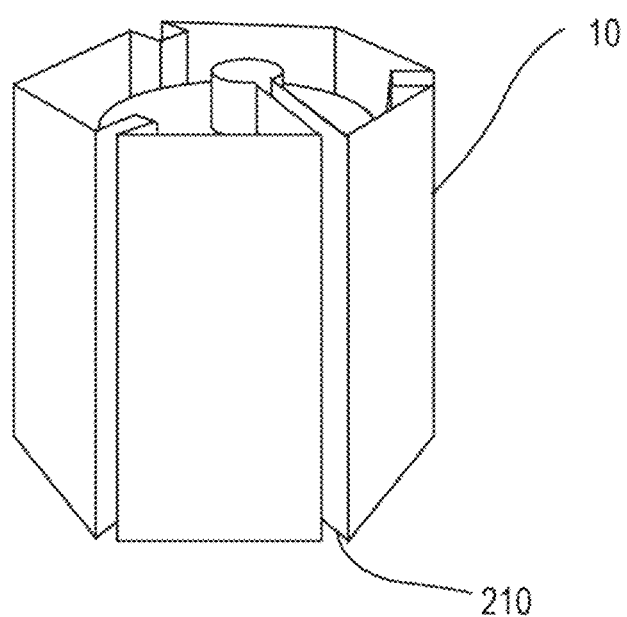
FIG. 3A shows an embodiment comprising a fractal-truss fabrication robot.
Figure 3B:
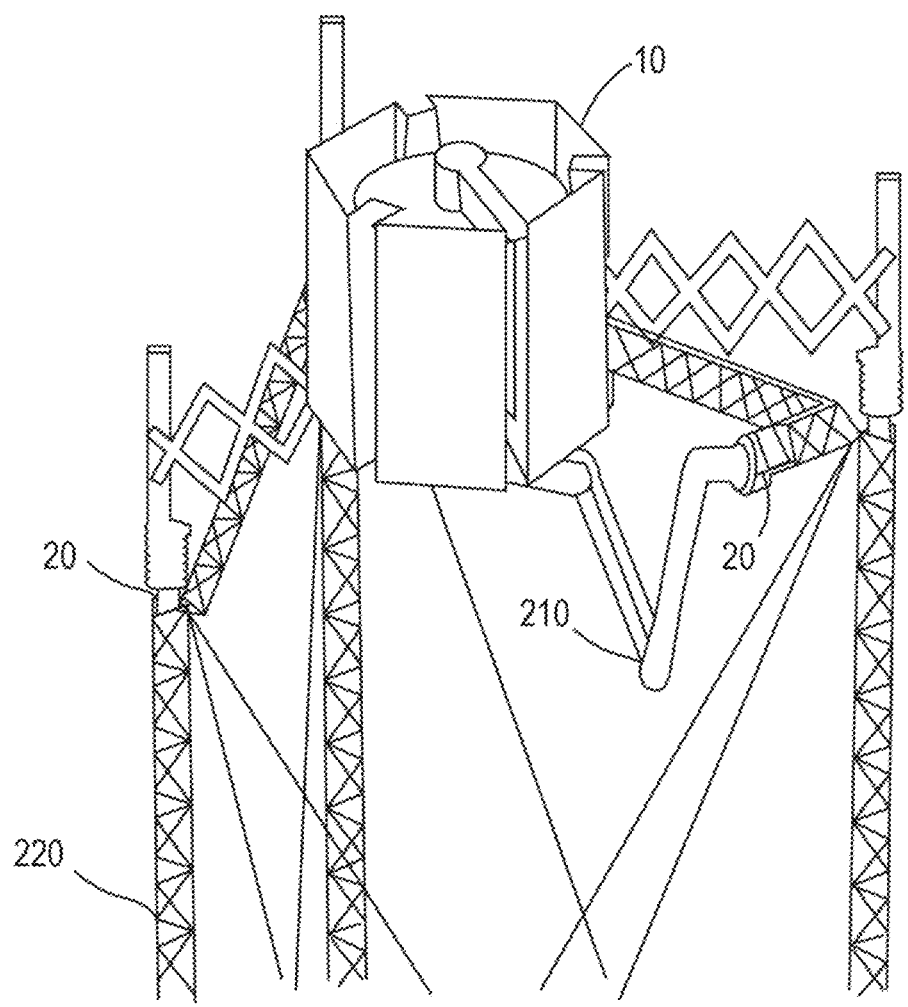
FIG. 3B shows an embodiment comprising a fractal-truss fabrication robot.

FIG. 3A shows an embodiment comprising a fractal-truss fabrication robot comprising a truss fabricator 10 having a robotic arm 210. A plurality of trusses 220 can be connected to one another to form a larger truss 230, called a second order truss 230 or a truss of trusses 230. FIG. 3B shows an embodiment comprising a fractal-truss fabrication robot comprising a truss fabricator 10 having a robotic arm 210 wherein a truss forming head 20 is mounted on the robotic arm 210 to form a truss 220. As shown in FIG. 3B, a truss fabricator 10 can comprise a plurality of truss forming heads 20 that form trusses 220. The plurality of truss forming heads 20 can be arranged to form a truss of trusses 230. Feed stock 110 is fed to each of the various truss forming heads 20. FIG. 3C shows an embodiment comprising a fractal-truss fabrication robot comprising a truss fabricator 10 having a robotic arm 210 wherein a truss forming head 20 is mounted on the robotic arm 210 to form trusses 220. In FIG. 3B, a plurality of truss forming heads 20 form parallel trusses 220 and another truss forming head 20 mounted on a robotic arm 210 forms trusses 220 that connect the parallel trusses 220 to one another.

Figure 4A:
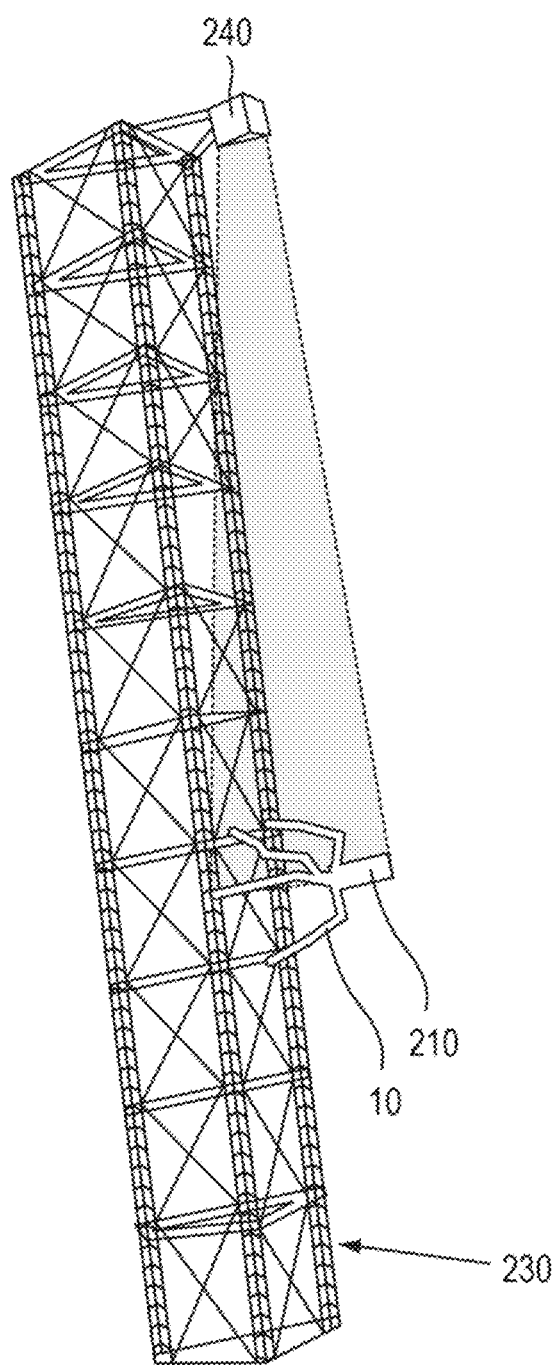
FIG. 4A shows an embodiment comprising an apparatus for global metrology.

FIG. 4A shows an embodiment comprising an apparatus for global metrology 240 and a truss fabricator 10 with robot arms 210.

Figure 4B:
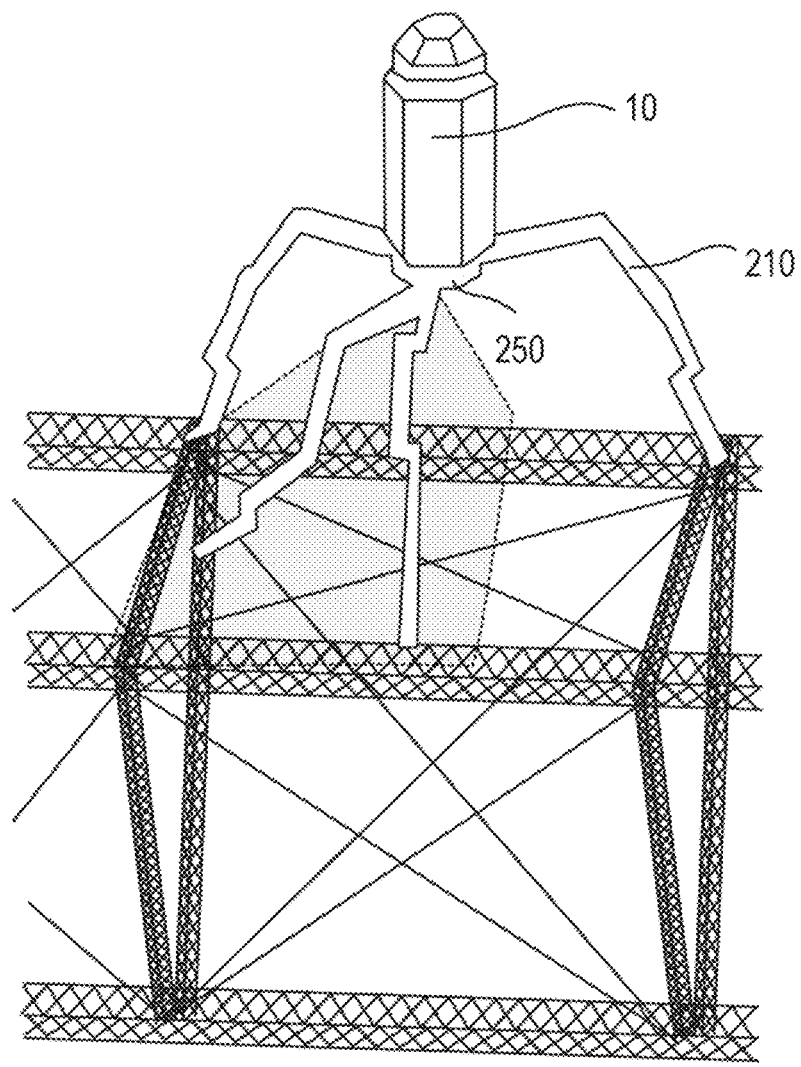
FIG. 4B shows an embodiment comprising a fractal-truss fabrication robot comprising an apparatus for local metrology.
Figure 4C:
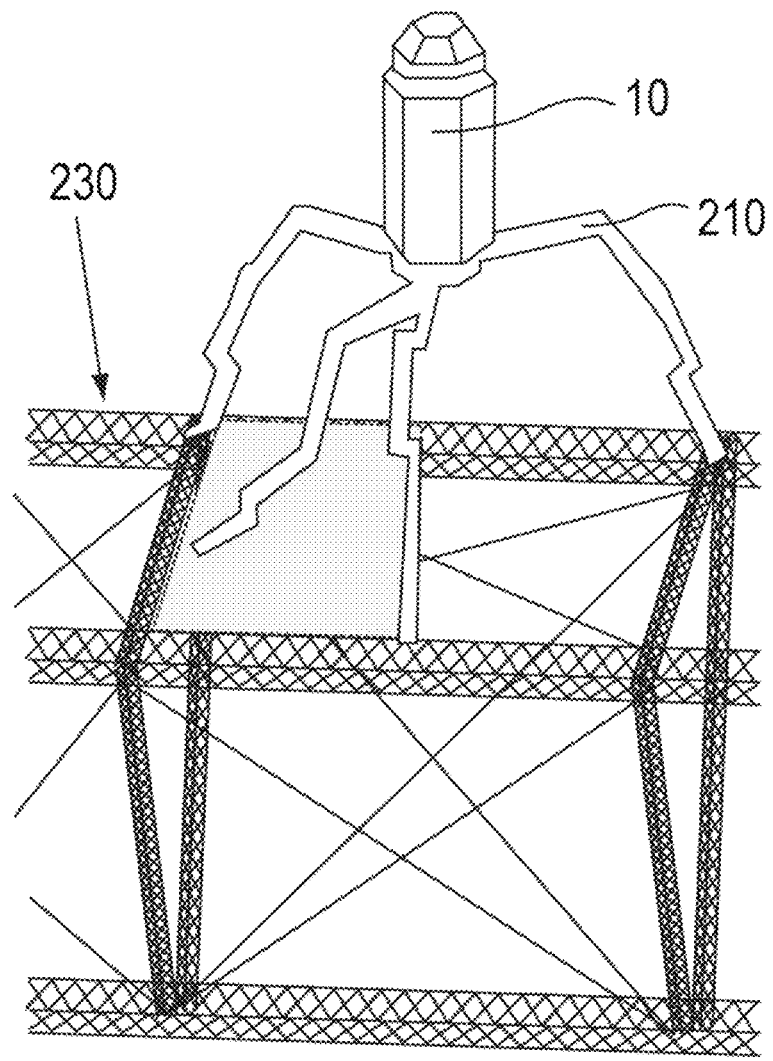
FIG. 4C shows an embodiment comprising a fractal-truss fabrication robot comprising an apparatus for local metrology.

FIGS. 4B and 4C show an embodiment comprising a fractal-truss fabrication robot 10 comprising an apparatus for local metrology 250.

As shown in FIGS. 4B and 4C, a truss fabricator 10 can comprise robot arms 210 and a local metrology system 250. A global metrology system 240, as shown in FIG. 4A, can measure a structure under construction and guide a truss fabricator 10 along the structure, which in the present example comprises a truss of trusses 230. The local metrology system 250 measures structures being formed in its vicinity. Metrology systems would typically provide input to control systems that guide feed-heads.

Figure 5:
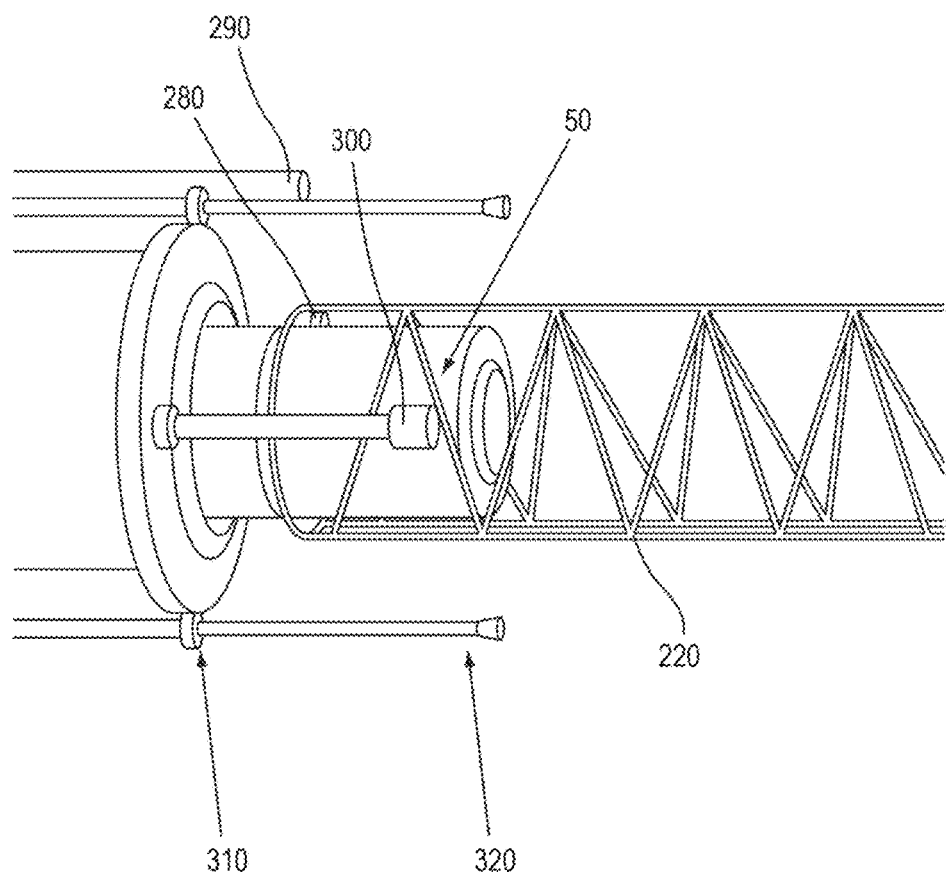
FIG. 5 shows an embodiment comprising a truss maker.

FIG. 5 shows an embodiment comprising a truss maker. Said truss maker comprises a truss forming jig 50 that is rotatably mounted within a bay 360. Grippers 280 are slidably mounted on said truss-forming jig 50 so that grippers 280 can grip a truss 220 and translate along said truss-forming jig 50 to move the truss 220. A feed head 320 is slidably mounted proximate to said truss-forming jig 50 so that said feed head 320 can translate near said truss-forming jig 50 while extruding truss material as said truss-forming jig 50 rotates independently of said feed head 320 to form a section of a truss 220 by wrapping truss material extruded from said feed head 320 around said rotating truss forming jig 50. CFRTP yarn unwinds from a source spool 110 and passes through a CFRTP yarn feed guide 310 to said feed head 320 from which it is extruded and wrapped around said truss-forming jig 50 to form said truss 220. Truss-formation is monitored via an inspection camera 290 and a boresight camera 250. A truss termination tool 300 is mounted alongside the truss-forming jig 50.

Figure 6:
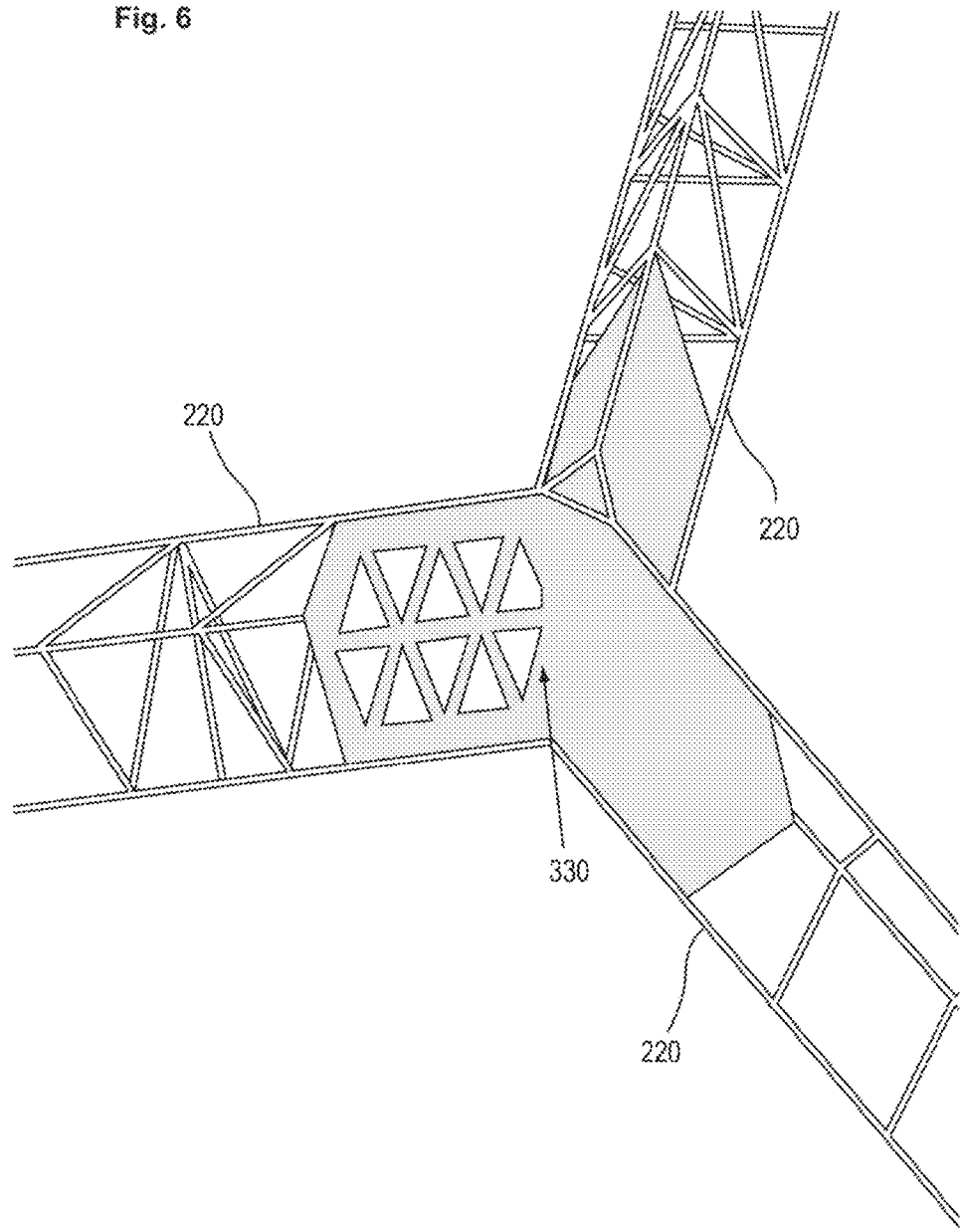
FIG. 6 shows an embodiment comprising trusses connected by a truss connector.

FIG. 6 shows an embodiment comprising trusses 220 connected by a truss connector 330.

In accordance with an embodiment, FIGS. 7 through 21 illustrate a method of forming a truss 220 on a truss forming jig 50 that is rotatably mounted within a bay 360. Jig pins 350 are retractably mounted in said truss forming jig 50 so that the jig pins 350 can extend to engage said truss 220 and disengage from said truss 220 by retracting. A first set of grippers 340 is slidably mounted on said truss-forming jig 50 so that said first set of grippers 340 can grip said truss 220 and translate along said truss-forming jig 50 to move said truss 220 within said bay 360. A second set of grippers 370 is slidably mounted on said truss-forming jig 50 so that said second set of grippers 370 can grip said truss 220 and translate along said truss-forming jig 50 to move said truss 220 within said bay 360. A feed head 320 is slidably mounted on the interior within said bay 360 so that said feed head 320 can translate along the interior of said bay while extruding truss material as said truss-forming jig 50 rotates to form a section of a truss 220 by wrapping truss material extruded from said feed head 320 around said rotating truss forming jig 50.

FIG. 7 shows an embodiment comprising a step in a method for making a truss, wherein said feed head 320 wraps a segment of said truss 220.

FIG. 8 shows an embodiment comprising a step in a method for making a truss, wherein said first set of grippers 340 grabs said truss 220.

FIG. 9 shows an embodiment comprising a step in a method for making a truss, wherein said jig pins 350 disengage from said truss 220 and retract.

FIG. 10 shows an embodiment comprising a step in a method for making a truss, wherein said first set of grippers 340 translates said truss 220 forward to midpoint of bay 360.

FIG. 11 shows an embodiment comprising a step in a method for making a truss. Second set of grippers 370 grasp truss 220

FIG. 12 shows an embodiment comprising a step in a method for making a truss, wherein said first set of grippers 340 releases truss 220.

FIG. 13 shows an embodiment comprising a step in a method for making a truss, wherein said second set of grippers 370 translates truss 220 forward to forward half of bay 360.

FIG. 14 shows an embodiment comprising a step in a method for making a truss, wherein said jig pins 350 extend and engage truss 220.

FIG. 15 shows an embodiment comprising a step in a method for making a truss, wherein said second set of grippers 370 releases truss 220.

FIG. 16 shows an embodiment comprising a step in a method for making a truss, wherein said feed head 320 wraps a second segment of said truss 220.

FIG. 17 shows an embodiment comprising a step in a method for making a truss, wherein said first set of grippers 340 grabs said truss 220 and jig pins 350 disengage from said truss 220 and retract.

FIG. 18 shows an embodiment comprising a step in a method for making a truss, wherein said first set of grippers 340 slide said truss 220 forward about one half the length of the bay 360

FIG. 19 shows an embodiment comprising a step in a method for making a truss, wherein said second set of gripper 370 grab truss FIG. 20 shows an embodiment comprising a step in a method for making a truss, wherein said first set of grippers 340 release truss 220

Figure 22A:
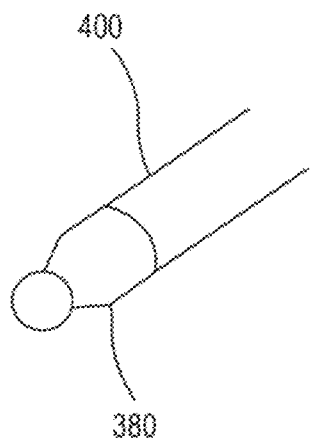
FIG. 22A shows an embodiment comprising components for making a truss from extruded or pultruded longerons.
Figure 22C:
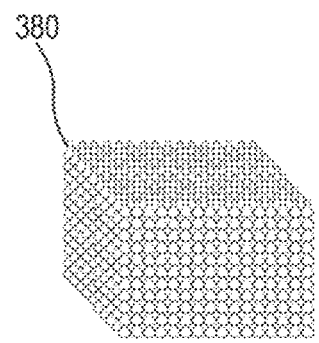
FIG. 22C shows an embodiment comprising components for making a truss from extruded or pultruded longerons.
Figure 22B:
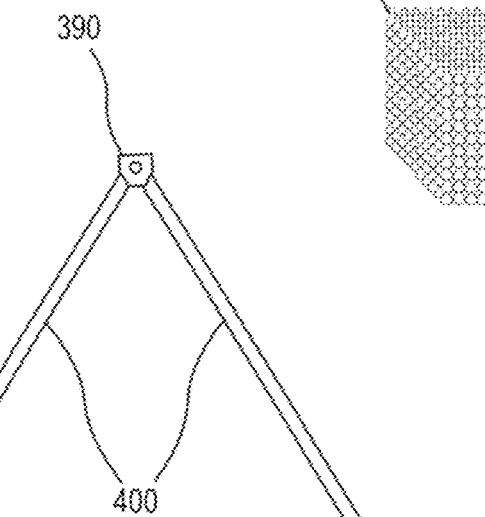
FIG. 22B shows an embodiment comprising components for making a truss from extruded or pultruded longerons.
Figure 22D:
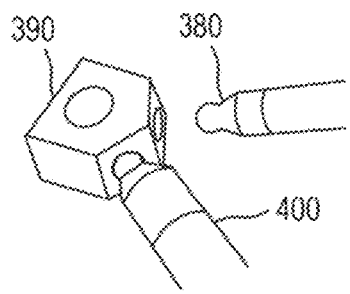
FIG. 22D shows an embodiment comprising components for making a truss from extruded or pultruded longerons.

FIG. 21 shows an embodiment comprising a step in a method for making a truss, wherein said second set of grippers 370 slide truss 220 forward FIG. 22A shows an embodiment comprising components for making a truss from extruded longerons, wherein said components comprise extruded longerons 400, ball end caps 380 fitted to the ends of the longerons 400. FIG. 22B shows an embodiment comprising components for making a truss from extruded longerons, wherein said components comprise extruded longerons 400 and joints 390 into which said ball end caps fit. FIG. 22C shows an embodiment comprising components for making a truss from extruded longerons, wherein said components comprise ball end caps 380 stacked together. FIG. 22D shows an embodiment comprising components for making a truss from extruded longerons, wherein said components comprise extruded longerons 400, ball end caps 380 fitted to the ends of the longerons 400, and joints 390 into which said ball end caps 380 fit.

Figure 23:
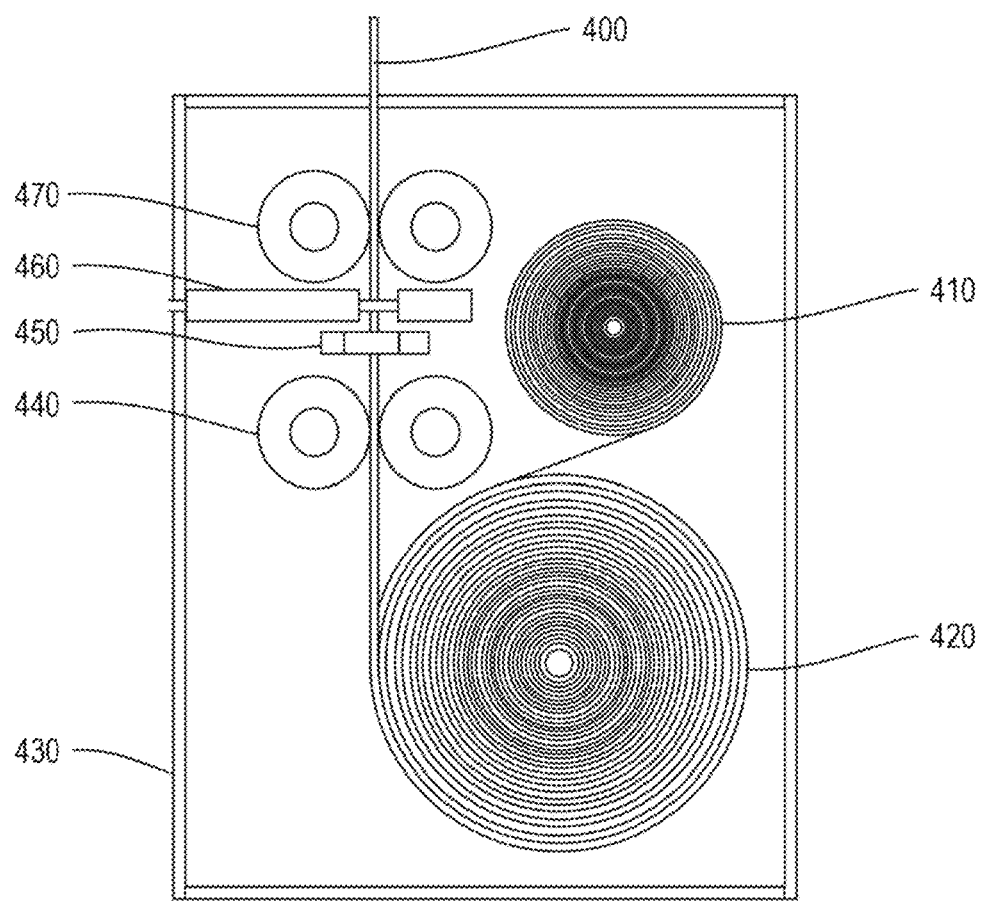
FIG. 23 shows an embodiment comprising a device for pultruding a longeron.

FIG. 23 shows an embodiment comprising a device for extruding a longeron comprising a coil of UV-curable glass prepreg 420 stored within a light tight box 430. Forming wheels 440 mounted within said light tight box 430 engage and shape said UV-curable glass prepreg 420 into the desired cross sectional shape and a UV cure lamp 450 cures and hardens the shaped glass prepreg 420 to produce the cured tube 400. Drive wheels 470 are rotatably mounted to said light tight box 430 for engaging and pulling said cured tube 400 and thereby further uncoiling said UV-curable glass prepreg 420. A cutter 460 is mounted to said light tight box 430 in a position to allow it to cut said cured tube after a desired length of cured tube has been produced. Optionally, optical fiber 410 a coil of optical fiber may be rotatably mounted to said light tight box whereby optical fiber can be attached to said UV-curable glass prepreg 420 so that optical fiber uncoils as the UV-curable glass prepreg 420 uncoils and the cured tube that is produced by the device can have an optical fiber incorporated along its length.

Figure 24A:
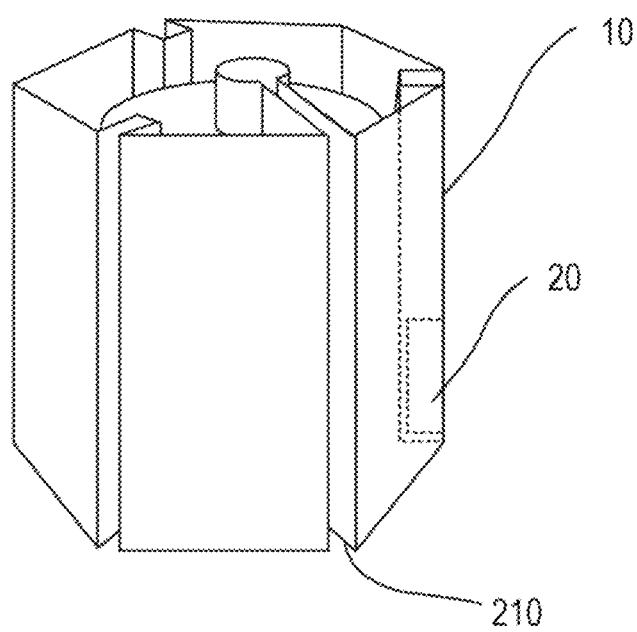
FIG. 24A shows an embodiment comprising a trusselator (truss fabricator), a truss maker, and a robot arm.

FIG. 24A shows an embodiment in a stowed position comprising a trusselator (truss fabricator) 10; a truss maker 20; and a robot arm 210.

Figure 24B:
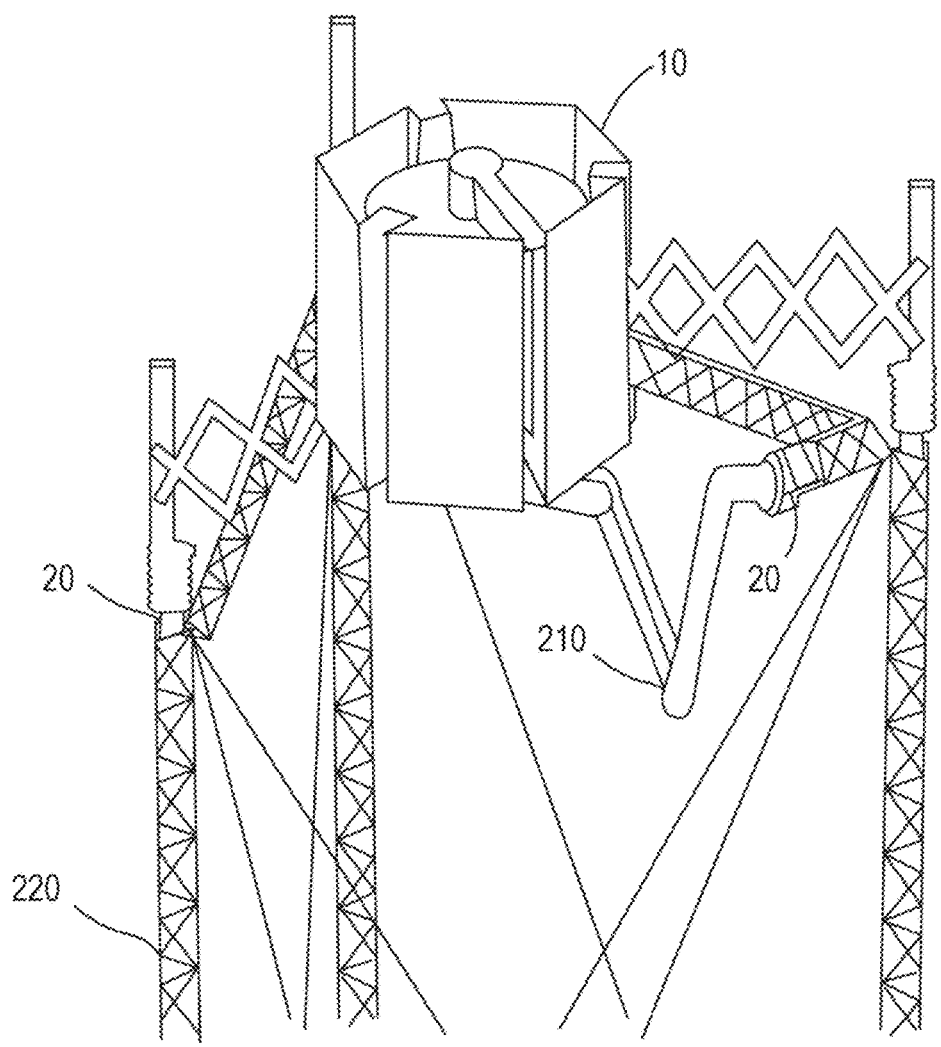
FIG. 24B shows an embodiment comprising a trusselator (truss fabricator), truss maker, a robot arm, and a truss.

FIG. 24B shows an embodiment comprising a trusselator (truss fabricator) 10, truss maker 20, a robot arm 210, and a truss 220. The embodiment is shown fabricating a second order truss.

FIG. 24C shows an embodiment comprising a trusselator (truss fabricator) 10, a truss maker 20, a robot arm 210, and a truss 220. The embodiment is shown fabricating a second order truss.

Figure 25:
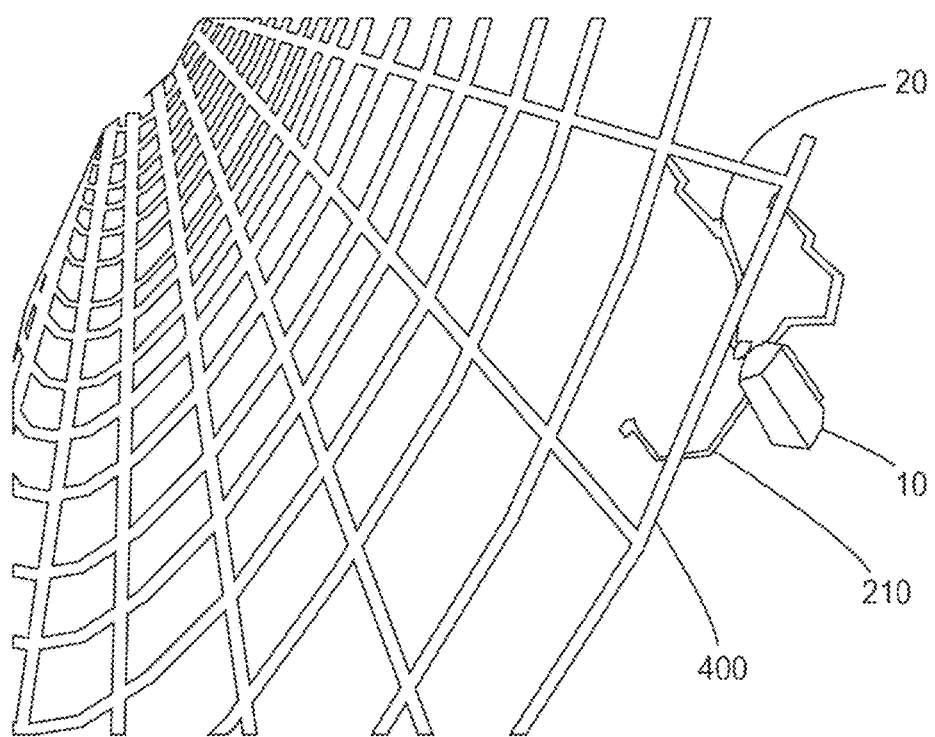
FIG. 25 shows an embodiment comprising a trusselator (truss fabricator), a truss maker, a robot arm, and longerons.

FIG. 25 shows an embodiment comprising a trusselator (truss fabricator) 10, a truss maker 20 a robot arm 210, and longerons 400. The embodiment is shown fabricating a large structure in space made of trusses that are formed in place.

Figure 26A:
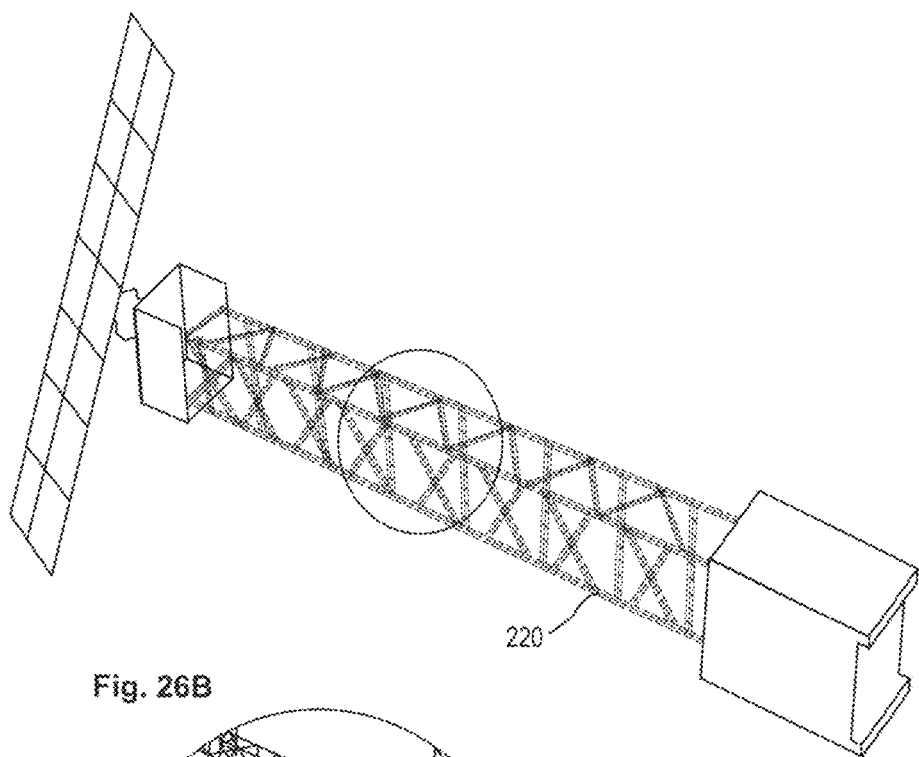
FIG. 26A shows an embodiment comprising a truss.
Figure 26B:
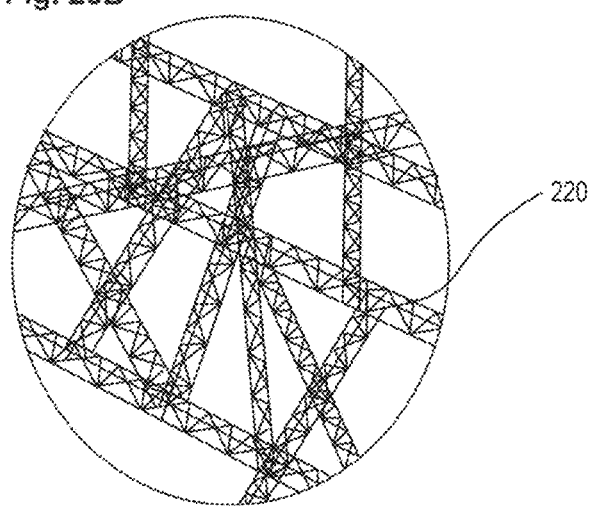
FIG. 26B shows an inset of an embodiment comprising a truss.

FIG. 26A shows an embodiment comprising a truss 220. The inset, FIG. 26B, shows that the truss is a second order truss.

Embodiments can use pultrusion of pre-consolidated carbon fiber/PEEK tape through three heated dies to extend continuous longerons, and additional pultrusion heads on stages that rotate around the longerons to place crossmembers to create a triangular truss.

An embodiment uses a total of three cross-member pultrusion heads mounted on two counter-rotating arms to wind diagonal cross-members. An arm with one pultrusion head rotates at twice the rate of an arm with two heads in order to create a 'symmetric' structure. This truss geometry can be called the 2:1 Truss. This embodiment has the advantage that it can be implemented with a largely mechanical approach, with minimal software control required. A potential disadvantage is that because this mechanism has two members wrapping in one direction and one in the other direction, the relative tension between the pultrusion heads may need to be carefully tuned to minimize residual torsional stress in the structure it produces.

Another embodiment uses a single feed head for laying cross members. The single feed head is mounted on a 1-D translation stage, which is in turn mounted on a single orbiting arm. The translation stage enables motion back and forth along the axial direction, enabling the single feed head to wrap both perpendicular battens and diagonal crossmembers onto the longerons. Several retractable pins could be used to constrain the wrapped members in the proper position as the feed head moves back and forth. This embodiment has the advantages that it has greater flexibility in the truss configurations it can create, and can potentially achieve better structural efficiency by incorporating both battens and diagonals. However, it will require a more sophisticated motion control system, and possibly also several motor-control signals passing through a slip-ring rotary coupling.

A 2:1 truss would have little or no coupling of lateral end displacements to twist modes, but may exhibit some twist coupling to axial displacements. However, because when 1st-order trusses are intended to serve as structural elements for a larger, 2nd-order truss, this moderate twist coupling is not likely to be significantly detrimental.

The raw material for a truss can comprise pre-consolidated CF/PEEK tape. Longeron tape in a standard wide roll can be cut down to size in tapes sized for longeron elements. Cross member tapes can be custom made at the desired width. An embodiment can comprise tapes on a total of 6 spools, three for the longerons and three for the cross members. Tape can be on an adjustable clutch-tensioned spool or a simple shell-housing spool with an inherent tensioning effect. An embodiment can comprise automated spool replacement/replenishment to enable fabrication of unlimited lengths of truss.

All three longerons can be made simultaneously using a two stage heating and forming process with common thermal blocks and modular/replaceable dies. Embodiments can comprise circular cross-section longerons, V-shaped longerons, or other cross-section shapes. V-shaped longeron geometry works well for providing a large bond surface for the wrapping elements, as well as improved stiffness over a circular longeron while using the same amount of material.

Example structures and methods of manufacture can comprise longerons that exit forming dies and then slide along a mandrel that holds them in place while crossmembers are wrapped around longerons. Reliable and high-strength bonding of cross members onto longerons is important for a successful truss. Methods can rely on the tension of the cross members to provide adequate pressure for bonding. Care should be taken that high tension levels that do not deform a longeron. To improve the strength and reliability of the bonding between the elements, a heated pressure plate can be integrated into wrapping dies. A heated pressure plate can improve the bond quality.

An example truss-formation device is designed to fabricate a triangular cross section truss that is 8 cm on a side. Changing the truss diameter can be accomplished by changing the jig geometry and moving the pinch rollers. It is possible to vary the truss cross section as the machine is operating by actuating the jig elements radially.

To enable fabrication of very long trusses, a trusselator device comprises a means to motivate the truss, pushing it out of the mechanism in a continuous fashion. Alternatively, an external mechanism can pull the truss out of the device, where the pulling apparatus must have sufficient strength to pull the longerons and cross-members through their pultrusion dies. Additionally, the motivation of the truss needs to be applied after the cross members have been wrapped, the motivation mechanism must accommodate a non-uniform cross section. To accomplish this, a mechanism that uses semi-compliant pinch rollers can grip and push the truss. Alternatively, the static mandrel and pinch roller combination, can be replaced with a chain-like moving mandrel that performs both functions.

Control of heated die temperatures can be accomplished using low cost PID temperature controllers. Controllers can be integrated downstream of the slip rings. Control of pinch rollers and rotary arms can be accomplished using Gecko motor drivers.

An alternate method for constructing structures, can comprise wrapping tape onto pre-formed longerons.

An alternate method for constructing structures, can comprise fabrication of a truss-like composite structure using a yarn as the material feedstock, such as a commercially available CFRTP yarn called 'TwinTex' that is composed of co-mingled fiberglass and PET thermoplastic filaments. An embodiment can create rigid rod elements by pulling TwinTex yarn through a heated die, with three feed heads making continuous longerons, and one rotating head wrapping a spiral element around the longerons to connect them together. A heated die can both consolidate and shape the CFRTP into rods. Joining thermoplastic composites requires heat and pressure. The pressure applied to the joints comes from the tension of the yarn wrapping around the longerons passively, and the heat comes from the extrusion dies. This embodiment requires few moving parts and is sufficient for basic fabrication. However, it has a number of limitations that must be addressed in order to be suitable for use in constructing space structures. TwinTex yarn feedstock presents challenges in routing through the device without fraying or tangling due to the fragility of the fiberglass filaments. TwinTex composite material is not well suited for space applications, due in part to the low temperature tolerance and high outgassing properties of the PET thermoplastic matrix, and also to the relatively low mechanical performance of the glass fiber. This mechanism wraps only a single element spiraling around the longerons to tie them together. Consequently, the resulting structures are susceptible to a torsional mode and had low shear stiffness that makes it insufficient for many structural applications.

An example could comprise making trusses out of pre-pultruded rods by melting the plastic matrix only at the joints to allow the cross member rods to bend, and to weld them to the longeron rods. With this method, the rods can either be stored on a small spool as tape and formed into rods on orbit (in a separate step prior the bending and welding operations), or they can be formed into rods on the ground and stored on a relatively large spool. Achieving a high quality round rod cross-section requires heating the tape, forming it into a rod, and then cooling the matrix through its solidification point while supporting the shape of the cross section with a cooling die or set of rollers. Once the rod section has been cooled, it needs to be locally reheated to bend and weld at the joints. To minimize the bend stresses in the upper and lower fibers, the rod naturally tends to flatten out along the bending axis. This has the fortunate side effect of increasing the bond area at the joint. However, in a continuous process where an extended length of the rod member is soft at the time it is bent over the longeron, this effect also creates a potential source of distortion of the fibers along the length of the rod. Consequently the method used for bonding the cross-members to the longerons must balance the need to provide sufficient contact area for bonding with minimizing strain or distortion in the elements due to differential bending. This effect can lead to excessive flattening of some of the cross members.

Truss material can comprise composites of carbon fiber and PEEK thermoplastic. These composites can provide not only very high unidirectional structural performance (130-515 Gpa Elastic Modulus) but also very high temperature tolerance (service temperatures up to 260° C.), and very low outgassing properties (0.31% TML, 0.00% CVCM). Moreover, the composition of CF/PEEK composites can be tuned to achieve near-zero longitudinal Coefficient of Thermal Expansion, which will minimize distortion and dynamics of space structures as their temperatures vary in orbit.

An embodiment comprises a pultrusion-like process to form CFRTP yarn into rod elements. In the pultrusion process, the CFRTP yarn slides through a hole in a die, and that hole constricts along its length to compress and consolidate the yarn into a rod. This compression needed to achieve good consolidation of the yarn requires relatively high tension on the yarn to pull it through the die. For this reason, it is desirable to separate the consolidation and shaping processes into two separate steps.

An embodiment can comprise an approach where the CF/PEEK material will be consolidated on the ground into a tape that can be wound very compactly, and then on-orbit that tape will be processed into its final shape. An embodiment can comprise a process of rod forming using a roll forming technique, in which material is first heated and then passed through a cool, profiled roller to compact and solidify the cross-section. Eliminating the majority of the sliding contact with the heated composite material significantly reduces the tension required to process the material and also improves the process cleanliness and reliability. High melt viscosity of PEEK resin, decreased friction, and slight outward compliance of the rollers can mitigate or eliminate accumulation of resin backflow.

An example process aims to cool the material through its solidification transition while it is under compaction by rollers, locking-in the desired round and well-consolidated cross-section. While this complicates the joining operation, the increased uniformity would be beneficial to the mechanical performance of the trusses produced.

An example method comprises heating the rod at the point where it will bend over the longeron, and use pressure and/or tension to force it to conform to the bend. A more controlled way to flatten out the rods just at the joint locations is to use a varyingly contoured roller to do the shape-setting, where the circumference of the roller corresponds to the length of the members being formed by the roller. This method could achieve control over the wrapping members' cross-sections as they transition from round to flat and back. This approach could also allow the middle of these rod members to be slightly flattened, or ovalized, in their middles in the opposite direction, to compensate for the radially non-uniform boundary condition caused by the flattened sections at the joints, balancing the buckling strengths of the wrapped members between their two possible buckling axes. To provide for controllable positioning of the ovalized segments, the material could be first shaped into a rod by a set of constant-cross-section roller dies, and then where a bend or joint is to be made, rollers could be actuated to re-shape the proper segment of the rod.

There are major advantages to making the feed head assemblies capable of automatically threading a fresh piece of feedstock through the forming process chain. An embodiment comprises an intermeshing roller to guide an incoming tape into the smooth profiled root section. This embodiment would require large diameter rollers.

An embodiment comprises a set of heated rollers to initially form heated tape material into a rod without the danger of freezing and jamming as it tapers into the rod shape. It also comprises a set of secondary rollers held at a lower temperature to ensure compaction and round cross-section as material is solidified. A gear train and lever arm layout actively drives the rotation of each of the rollers, as well as laterally moving the heated rollers in and out to allow a fresh end of tape to be automatically initiated into the forming process. A tape cutting mechanism could be located between the two sets of rollers to allow the extruded rod to be truncated on demand.

A metal surface heated above the melt temp of the PEEK will tend to adhere to the composite, potentially peeling off and winding-up any loose fiber ends that pass through the roller, whereas sliding contact with a heated stationary surface can have a self-cleaning effect that prevents this. Heat can be transferred to the rollers through their axels or enclosures. Bearings do not generally provide good thermal conductivity, being typically made of low conductivity metals, and having very small contact patches through the rolling elements. A bushing, rather than a rolling element bearing, could provide sufficient thermal conductivity, but would need to operate continuously at temperatures around 400 C, which may necessitate exotic materials such as carbon/graphite composite, which may have issues with wear and dust generation, not to mention their high cost and less well characterized performance.

An embodiment comprises a cool-roller-forming mechanism where formed rods will be under external compaction as they cool through their solidification transition. Applying high pressure as the matrix is solidified is a standard requirement in high performance composite processing, but it is less critical in the case of the rod members of trusses due to the simpler geometries and produced loads within trusses, and this consideration lowers the priority on full compaction of rod materials.

An embodiment comprises a two piece sliding die that opens wide to easily accept a new cut end of composite tape, and then closes around the heated tape, guiding the tape inward with interleaved and gently tapered and radiused guide surfaces, ending up with a straight-through cylindrical hole.

An embodiment comprises a sliding die machined in 3 pieces. A sliding male piece allows a new tape to be started easily, sliding like a piston within a female die, with minimal opportunity for pinching or jamming. This embodiment has the ability to reliably and cleanly initiate a new end of tape, due to the shallower acceptance angle of ~7 degrees and the minimized length of the internal geometry that is at the final small diameter.

An embodiment comprises a single-piece die design, for wrapping the battens and/or diagonals, that incorporates a small integral heated surface to slide against the longerons prior to laying the wrapping members; and a long, gradually-cooling surface to slide over the joint after the wrapped member has been laid down. The flattening of the wrapping members at the joints can be made extreme, or it can be throttled back to balance the buckling strength with the bond strength. This die has the limitation that it does not easily allow sharp changes in wrapping direction, which can difficult material routing topology, and drive requirements for the location of the feedstock spools. The mechanical simplicity that this embodiment regarding the machine motion sub-systems and feed head technology is a significant advantage.

An embodiment comprises a pultrusion die that manually wraps cross members between three longerons, where the die is suited for wrapping at a continuous angle on a single degree of freedom rotary axis, with additional dies of the same type on a counter-rotating stage.

In order to make a 3-longeron truss with symmetric geometry, 6 wrapping feed heads would be necessary, 3 wrapping in each direction. To make an asymmetric truss, only 3 wrapping heads are necessary, with 2 wrapping in one direction and 1 in the opposite direction at twice the rotation rate. These machine configurations might be very efficient and create very high quality trusses, but they would each lock in a particular wrapping pattern, making it challenging to vary the geometry for changing circumstances.

An embodiment comprises a method of achieving a flattened cross section at the joints, by wrapping the diagonals while they are still in tape form, and only reshaping the middle segments of the members into rigid cross-sections after they have been bonded onto the longerons. Because forming the cross section requires adding some curvature to the fibers, increasing their path length for a given longeron spacing, the longerons might need to be drawn closer together over the course the cross member wrapping, decreasing the truss 'diameter', as the diagonal tapes are formed into rods.

An embodiment comprises higher-than-typical resin content at the joints between the elements in order to achieve sufficient strength at moderate wrapping pressure levels. Higher fiber content (~65% by weight) is preferred for the majority of the lengths of the rod members, but this material ratio does not provide enough excess resin to effectively join the crossing-over rods.

An embodiment comprises wrapping longerons with lenticular tape. While wrapping flat tape onto the longerons would necessitate a subsequent forming operation to rigidize the wrapping members, using tape that already has a lenticular section allows the tape to be stored tightly on a spool just like a flat tape, eliminate the need for the secondary forming step. Lenticular tape, could provide sufficient rigidity, and increased toughness. This is because when the lenticular members are overloaded in compression and buckle, they don't tend to break, just flatten and bend, and then pop back in place once the load has been released, which could allow the trusses to be made with less material while being more resistant to mechanical damage from abnormal service loads such as accidental collisions. Whereas trusses made of rods would likely need to be made strong enough to never buckle, since they are likely to break as soon as they do, trusses made of lenticular sections would only need to resist buckling under normal service loads, and could be designed to temporarily buckle without breaking under any abnormal loads, allowing the structure to deflect significantly to absorb the energy of a moderate impact. The fact that the lenticular sections of the diagonal members have to flatten out to wrap around the joints to the longerons limits their structural potential significantly compared to most lenticular designs which stabilize the arc shaped cross-section at the ends. The arc-shaped cross-section does persist through the middle of the members, though it flattens out somewhat. The flattening effect may become insignificant with a longer and narrower lenticular tape member. Similar to the effect of forming members out of tubes, a lenticular section creates a member with a greater mass moment of inertia than a solid round rod, so it has the potential to increase the buckling strength.

An embodiment could comprise longerons made with lenticular tape as well. This would change the joint situation somewhat, improving it by increasing the radius over which the wrapping members need to bend (which could help enable the usage of higher modulus carbon fibers), and in creating greater bond area, but worsening with regard to the stability and stiffness of the truss. An embodiment comprises forming the trusses by using short straight cut members, joining only by deposition of a thermoplastic fillet between the ends of the members, rather than using continuous elements and wrapping the diagonals around the longerons at the joints. This approach has several benefits: it is easier to align the axes of the members to minimize initial obliquity that would apply bending loads to the members which can increase their buckling strength; it becomes possible to use desirable truss geometries that would require excessively sharp turns with a continuous wrap approach; it enables a greater potential variety of miniature truss geometries from the same machinery; and it opens up some additional possibilities for packaging of stored feedstock and for pre-processing of the individual rod elements. The joint material, not being as strong as the fiber reinforced composite, may decrease the mass-efficiency of the structure compared to joints based on directly laminating the continuously fiber reinforced rod members.

While these embodiments have been described with emphasis on the embodiments, it should be understood that within the scope of the appended claims, the embodiments might be practiced other than as specifically described herein.

The invention claimed is:

1. A truss-formation device comprising:
   a thermal die, wherein said thermal die comprises a melt section and a consolidation section, wherein said melt section is wrapped with heater wire to heat up and melt continuous fiber reinforced thermoplastic yarn wherein said consolidation section is positioned adjacent to said melt section so that said melted continuous fiber reinforced thermoplastic yarn from said melt section enters the consolidation section where said consolidation section is configured to squeeze and extrude said continuous fiber reinforced thermoplastic yarn as a continuous fiber reinforced thermoplastic solid element;
   a second thermal die and a mandrel that connects said thermal die to said second thermal die wherein said thermal die and said second thermal die are parallel to one another such that said thermal die and said second thermal die are oriented to extrude parallel continuous fiber reinforced thermoplastic solid elements; and a third thermal die and a batten actuator, wherein said batten actuator is rotatably connected to said mandrel and said third thermal die is mounted on said batten actuator such that as said batten actuator rotates said third thermal die orbits around said thermal die and said second thermal die.

2. The truss-formation device of claim 1 wherein said third thermal die is oriented at an angle relative to thermal die and said second thermal die.

3. The truss-formation device of claim 1 wherein said third thermal die is oriented to extrude a continuous fiber reinforced thermoplastic solid element that connects said extruded parallel continuous fiber reinforced thermoplastic solid elements to one another as said batten actuator causes said third thermal die to orbit around said thermal die and said second thermal die.

* * * * *